United States Patent  (10) Patent No.: US 12,308,637 B2
Rozenshtein et al.  (45) Date of Patent: May 20, 2025

(54) CURRENT SINKING ARRANGEMENT

(71) Applicant: GridON Ltd, Givatayim (IL)

(72) Inventors: Vladimir Rozenshtein, Givatayim (IL); Dvir Landwer, Givatayim (IL); Uri Gabri, Givatayim (IL)

(73) Assignee: GridON Ltd, Givatayim (IL)

( * ) Notice: Subject to any disclaimer, the term of this patent is extended or adjusted under 35 U.S.C. 154(b) by 105 days.

(21) Appl. No.: 18/038,587

(22) PCT Filed: Nov. 23, 2021

(86) PCT No.: PCT/IB2021/060862
§ 371 (c)(1),
(2) Date: May 24, 2023

(87) PCT Pub. No.: WO2022/112938
PCT Pub. Date: Jun. 2, 2022

(65) Prior Publication Data
US 2023/0411955 A1 Dec. 21, 2023

(30) Foreign Application Priority Data
Nov. 24, 2020 (GB) ...................................... 2018480

(51) Int. Cl.
H02H 9/02 (2006.01)
(52) U.S. Cl.
CPC ..................................... H02H 9/02 (2013.01)
(58) Field of Classification Search
CPC ................................ H02H 9/02; H02H 9/021
(Continued)

(56) References Cited

U.S. PATENT DOCUMENTS 1,774,417 A   8/1930  Burnham
2,924,752 A * 2/1960  Scott, Jr. ................ H01H 71/24
                                                       361/103

(Continued)

FOREIGN PATENT DOCUMENTS

CN  203811739 U  9/2014
CN  104617580 B  5/2017

(Continued)

OTHER PUBLICATIONS

Machine translation of Boyer et al. French Patent Document FR 2789817 A1 Aug. 2000 (Year: 2000).*

(Continued)

Primary Examiner — Kevin J Comber
(74) Attorney, Agent, or Firm — Ziegler IP Law Group, LLC.

(57) ABSTRACT

A current sinking arrangement is provided that comprises a current sinking arrangement for connection to three phases of an AC grid, operable for reduction of short circuit fault currents in the AC grid, the current diverting arrangement comprising first, second and third phase arrangements, each including first and second grid terminals and a current diversion branch having a first impedance and a first switch and connected to a common floating conductor. On reception of a signal indicating a fault, which requires fault current reduction, a switching arrangement is arranged to make the first switches conducting so as to divert a portion of the fault current away from the AC grid fault location to the common floating conductor.

20 Claims, 12 Drawing Sheets

(58) Field of Classification Search
USPC .......................................................... 361/93.9
See application file for complete search history.

(56) References Cited

U.S. PATENT DOCUMENTS

| | | | |
|---|---|---|---|
| 4,184,186 A | | 1/1980 | Barkan |
| 5,689,397 A | * | 11/1997 | Pohl ........................ H02H 3/023 |
| | | | 361/93.7 |
| 8,400,740 B2 | | 3/2013 | Schumacher et al. |
| 10,784,672 B2 | * | 9/2020 | Okerman ................ H01H 83/04 |
| 2004/0085087 A1 | | 5/2004 | Zehentner et al. |
| 2013/0314828 A1 | | 11/2013 | Chen et al. |
| 2016/0233661 A1 | * | 8/2016 | Liu ......................... H02H 3/167 |
| 2017/0207701 A1 | | 7/2017 | Shearer et al. |
| 2020/0091711 A1 | | 3/2020 | Shea et al. |
| 2020/0235562 A1 | | 7/2020 | Morich |

FOREIGN PATENT DOCUMENTS

| | | | | |
|---|---|---|---|---|
| CN | 207200270 U | | 4/2018 | |
| CN | 109950886 B | | 4/2020 | |
| DE | 19946098 A1 | * | 4/2001 | ............... H02H 3/33 |
| EP | 2624272 A1 | | 8/2013 | |
| FR | 2789817 A1 | * | 8/2000 | ............... H02H 9/08 |
| JP | S5989522 A | | 5/1984 | |
| JP | 2003209925 A | | 7/2003 | |
| WO | 9827635 A1 | | 6/1998 | |
| WO | 2018138723 A1 | | 8/2018 | |

OTHER PUBLICATIONS

Machine translation of Arnhold et al. German Patent Document DE 19946098 A1 Apr. 2001 (Year: 2001).*

Israel Patent Office, International Search Report, Application No. PCT/IB2021/060862, Mailed Mar. 9, 2022, 3 pages.

EATON Power Business Worldwide, Arc Quenching Magnum PXR Switchgear—Superior protection—in a flash, Publication No. BR019028EN/GG, Oct. 2022, 4 pages.

EATON Powering Business Worldwide, Instructions for installation, operation and maintenance of the Arc Quenching Device (AQD), Instruction Booklet IB019010EN, Effective Nov. 2022, 12 pages.

European Patent Office, Extended European Search Report, Application No. 21897279.2, mailed Apr. 3, 2025, 15 pages.

* cited by examiner

CURRENT SINKING ARRANGEMENT

The present invention relates to a current sinking arrangement.

An electrical grid is an interconnected network for delivering electricity from suppliers to consumers.

Faults in electrical power systems cannot be avoided. Fault currents flowing from the sources to a location of the fault lead to high dynamical and thermal stresses being imposed on equipment e.g. overhead lines, cables, transformers and switch gears.

Conventional circuit breaker technology does not provide a full solution to reduce or mitigate the effects of currents associated with such faults. The growth in electrical energy generation and consumption and the increased interconnection between networks leads to increasing levels of fault current. In particular, the continuous growth of electrical energy generation has the consequence that networks reach or even exceed the limits with respect to their short circuit withstand capability.

Short circuit currents are rising as transmission and distribution networks expand to address increasing energy demand and connectivity of power generation and intermittent energy sources. These may result in power disruptions, equipment damage and major outages, which have been estimated to cost billions of dollars per year.

The present invention sets out to provide a current sinking arrangement with improved performance compared to conventional fault current mitigation arrangements.

According to an aspect, there is provided a current sinking arrangement for connection to three phases of an AC grid, operable for reduction of short circuit currents in the AC grid, the current diverting arrangement comprising: a first phase arrangement including: a first grid terminal connectable to a node of a first phase of the three phase AC grid and a second grid terminal connectable to another node of the first phase of the three phase AC grid, the first phase arrangement having a first node between the first grid terminal and the second grid terminal; a current diversion branch having a first end connected to the first node and a second end connected to a second node, the current diversion branch comprising a first impedance connected in series between the first end and the second end, and a first switch connected in series between the first end and the second end, and wherein the first switch is not conducting in a first state and is conducting in a second state; a second phase arrangement including: a first grid terminal connectable to a node of a second phase of the three phase AC grid and a second grid terminal connectable to another node of the second phase of the three phase AC grid, the second phase arrangement having a first node between the first grid terminal and the second grid terminal; a current diversion branch having a first end connected to the first node and a second end connected to a second node, the current diversion branch comprising a first impedance connected in series between the first end and the second end, and a first switch connected in series between the first end and the second end, and wherein the first switch is not conducting in the first state and conducting in the second state; a third phase arrangement including: a first grid terminal connectable to a node of a third phase of the three phase AC grid and a second grid terminal connectable to another node of the third phase of the three phase AC grid, the third phase arrangement having a first node between the first grid terminal and the second grid terminal; a current diversion branch having a first end connected to the first node and a second end connected to a second node, the current diversion branch comprising a first impedance connected in series between the first end and the second end, and a first switch connected in series between the first end and the second end, and wherein the first switch is not conducting in the first state and conducting in the second state; a switching arrangement arranged to control the first switch of the first phase arrangement, the first switch of the second phase arrangement, and the first switch of the third phase arrangement; wherein the second nodes of the first phase arrangement, the second phase arrangement, and the third phase arrangement are all connected to a common floating conductor; wherein the first state represents normal conditions on the AC grid and the second state represents a fault condition on the AC grid; wherein, on reception of a signal indicating the second state, the switching arrangement is arranged to make the first switch of the first phase arrangement, the first switch of the second phase arrangement, and the first switch of the third phase arrangement conducting; wherein, when the first switches are in the second state, the current diversion branches are arranged to divert a portion of the fault current away from the AC grid fault location to the common floating conductor.

In some embodiments, one or more of the first phase arrangement, the second phase arrangement and the third phase arrangements includes a second impedance connected in series between the first grid terminal and the second grid terminal, the second impedance having a first terminal connected to the first grid terminal and a second terminal connected to the first node; wherein at least the combination of the first impedance and the second impedance acts as a current divider when the first switches are in the second state, so as to determine a portion of the current that is diverted away from the AC grid to the common floating conductor.

In some embodiments, one or more of the first phase arrangement, the second phase arrangement and the third phase arrangements includes a third impedance connected in series between the first grid terminal and the second grid terminal, the third impedance having a first terminal connected to the first node and a second terminal connected to the second grid terminal; wherein at least the combination of the first impedance and the third impedance acts as a current divider when the first switches are in the second state, so as to determine a portion of the current that is diverted away from the AC grid to the common floating conductor.

In some embodiments, one or more of the first phase arrangement, the second phase arrangement and the third phase arrangements includes: at least one bypass arrangement connected in series between the first end and the second end, the at least one bypass arrangement comprising a bypass impedance connected in series between the first end and the second end, and a bypass branch connected in parallel with the bypass impedance, the bypass branch comprising a second switch, wherein when the second switch is closed the bypass impedance is electrically bypassed; wherein, on reception of the signal indicating the second state, the switching mechanism is further arranged to independently selectively make the second switches of the at least one bypass arrangement conducting or non-conducting so as to vary an amount of current diverted away from the AC grid to the common floating conductor.

In some embodiments, one or more of the first phase arrangement, the second phase arrangement and the third phase arrangements includes: a fuse connected in series between the first end and the second end of the current diversion branch.

In some embodiments, first switch of one or more of the first phase arrangement, the second phase arrangement and the third phase arrangements includes one or more semiconductor devices.

In some embodiments, the current sinking arrangement further comprises: a control mechanism arranged to detect the fault condition on the AC grid; wherein on detection of the fault condition, the control mechanism is arranged to send a signal indicating a fault condition to the switching arrangement.

In some embodiments, the control mechanism comprises a current sensor arranged to detect a change in grid current which represents a transition between normal and fault conditions.

In some embodiments, the control mechanism comprises a voltage sensor arranged to detect a change in grid voltage which represents a transition between normal and fault conditions.

In some embodiments, the control mechanism is arranged to detect the fault condition on the basis of a received signal from an external device.

In some embodiments, the control mechanism comprises an arc detector, and wherein on detection of an arc, the control mechanism is arranged to send a signal indicating an arc fault condition to the switching arrangement indicating it to transition to the second state.

According to an aspect, there is provided a single phase current sinking arrangement comprising: a grid terminal connectable to a node of a single phase of an AC grid and a second grid terminal connectable to another node of the single phase of the AC grid, a current diversion branch having a first end connected to a first node between the first grid terminal and the second grid terminal, and a second end connected to ground, the current diversion branch comprising: a first impedance connected in series between the first end and the second end, a first switch connected in series between the first end and the second end, and wherein the first switch is open in a first state and closed in a second state; a bypass arrangement connected in series between the first end and the second end, the bypass arrangement comprising a bypass impedance connected in series between the first end and the second end, and a bypass branch connected in parallel with the bypass impedance, the bypass branch comprising a second switch, wherein when the second switch is closed the bypass impedance is electrically bypassed; a switching arrangement arranged to control the first switch and the second switch; wherein the first state represents normal conditions on the AC grid and the second state represents a fault condition on the AC grid; wherein, on reception of a signal indicating the second state, the switching arrangement is arranged to make the first switch conducting, wherein, when the first switch is in the second state, the current diversion branch is arranged to divert current away from the AC grid to ground; wherein, on reception of the signal indicating the second state, the switching mechanism is further arranged to selectively make the second switch conducting or non-conducting so as to vary an amount of current diverted away from the AC grid in the second state.

In some embodiments, the single phase current sinking arrangement further comprises a second impedance connected in series between the first grid terminal and the second grid terminal, the second impedance having a first terminal connected to the first grid terminal and a second terminal connected to the first node; wherein at least the combination of the first impedance and the second impedance acts as a current divider when the first switch is in the second state, so as to determine a portion of the current that is diverted away from the AC grid to ground.

In some embodiments, the single phase current sinking arrangement further comprises a third impedance connected in series between the first grid terminal and the second grid terminal, the third impedance having a first terminal connected to the first node and a second terminal connected to the second grid terminal; wherein at least the combination of the first impedance and the third impedance acts as a current divider when the first switch is in the second state, so as to determine a portion of the current that is diverted away from the AC grid to ground.

In some embodiments, the single phase current sinking arrangement further comprises at least one additional bypass arrangement, wherein, on reception of the signal indicating the second state, the switching mechanism is further arranged to independently selectively make the second switches of the respective bypass arrangements conducting or non-conducting so as to vary an amount of current diverted away from the AC grid in the second state.

In some embodiments, the single phase current sinking arrangement further comprises a fuse connected in series between the first end and the second end of the current diversion branch.

In some embodiments, the first switch includes one or more semiconductor devices.

In some embodiments, the single phase current sinking arrangement further comprises: a control mechanism arranged to detect the fault condition on the AC grid; wherein on detection of the fault condition, the control mechanism is arranged to send a signal indicating a fault condition to the switching arrangement; and wherein based on the signal indicating a fault condition, the switching arrangement is arranged to selectively make the second switch conducting or non-conducting so as to vary an amount of current diverted away from the AC grid.

In some embodiments, the control mechanism comprises a current sensor arranged to detect a change in grid current which represents a fault condition.

In some embodiments, the control mechanism comprises a voltage sensor arranged to detect a change in grid voltage which represents a fault condition.

In some embodiments, the control mechanism is arranged to detect the fault condition on the basis of a received signal from an external device.

In some embodiments, the control mechanism comprises an arc detector, and wherein on detection of an arc, the control mechanism is arranged to send a signal indicating an arc fault condition to the switching arrangement.

According to an aspect, there is provided a three phase current sinking arrangement for connection to three phases of the AC grid, the current sinking arrangement comprising: a first single phase current sinking arrangement according to any discussed embodiment for a first phase of the AC grid; a second single phase current sinking arrangement according to any discussed embodiment for a second phase of the AC grid; a third single phase current sinking arrangement according to any to any discussed embodiment for a third phase of the AC grid.

According to an aspect, there is provided a current sinking arrangement for connection to three phases of an AC grid, operable for reduction of short circuit currents in the AC grid, the current diverting arrangement comprising: a first phase arrangement including: a first grid terminal connectable to a node of a first phase of the three phase AC grid and a second grid terminal connectable to another node of the first phase of the three phase AC grid, the first phase arrangement having a first node between the first grid terminal and the second grid terminal; a current diversion branch having a first end connected to the first node and a second end, the current diversion branch comprising first switch connected in series between the first end and the second end, and wherein the first switch is not conducting in a first state and is conducting in a second state; a second phase arrangement including: a first grid terminal connectable to a node of a second phase of the three phase AC grid and a second grid terminal connectable to another node of the second phase of the three phase AC grid, the second phase arrangement having a first node between the first grid terminal and the second grid terminal; a current diversion branch having a first end connected to the first node and a second end, the current diversion branch comprising first switch connected in series between the first end and the second end, and wherein the first switch is not conducting in the first state and conducting in the second state; a third phase arrangement including: a first grid terminal connectable to a node of a third phase of the three phase AC grid and a second grid terminal connectable to another node of the third phase of the three phase AC grid, the third phase arrangement having a first node between the first grid terminal and the second grid terminal; a current diversion branch having a first end connected to the first node and a second end, the current diversion branch comprising a first switch connected in series between the first end and the second end, and wherein the first switch is not conducting in the first state and conducting in the second state; a switching arrangement arranged to control the first switch of the first phase arrangement, the first switch of the second phase arrangement, and the first switch of the third phase arrangement; wherein the second ends of the first phase arrangement, the second phase arrangement, and the third phase arrangement are all connected to a three phase delta connected floating impedance arrangement; wherein the first state represents normal conditions on the AC grid and the second state represents a fault condition on the AC grid; wherein, on reception of a signal indicating the second state, the switching arrangement is arranged to make the first switch of the first phase arrangement, the first switch of the second phase arrangement, and the first switch of the third phase arrangement conducting; wherein, when the first switches are in the second state, the current diversion branches are arranged to divert a portion of the fault current away from the AC grid fault location to the three phase delta connected floating impedance arrangement.

In some embodiments, the three phase delta connected floating impedance arrangement comprises: a first impedance, having a first terminal connected to the second end of the current division branch of the first phase arrangement, and a second terminal; a second impedance, having a first terminal connected to the second end of the current division branch of the second phase arrangement, and a second terminal; a third impedance, having a first terminal connected to the second end of the current division branch of the third phase arrangement, and a second terminal; wherein first terminal of the first impedance is connected to the second terminal of the second impedance, and the second terminal of the first impedance is connected to the first terminal of the third impedance; wherein first terminal of the second impedance is connected to the second terminal of the third impedance, and the second terminal of the third impedance is connected to the first terminal of the second impedance.

According to an aspect, there is provided a current sinking arrangement for connection to three phases of an AC grid, operable for reduction of short circuit currents in the AC grid, the current diverting arrangement comprising: a first phase arrangement including: a first grid terminal connectable to a node of a first phase of the three phase AC grid and a second grid terminal connectable to another node of the first phase of the three phase AC grid, the first phase arrangement having a first node between the first grid terminal and the second grid terminal; a current diversion branch having a first end connected to the first node and a second end connected to a second node, the current diversion branch comprising a first impedance connected in series between the first end and the second end; a second phase arrangement including: a first grid terminal connectable to a node of a second phase of the three phase AC grid and a second grid terminal connectable to another node of the second phase of the three phase AC grid, the second phase arrangement having a first node between the first grid terminal and the second grid terminal; a current diversion branch having a first end connected to the first node and a second end connected to a second node, the current diversion branch comprising a first impedance connected in series between the first end and the second end; a third phase arrangement including: a first grid terminal connectable to a node of a third phase of the three phase AC grid and a second grid terminal connectable to another node of the third phase of the three phase AC grid, the third phase arrangement having a first node between the first grid terminal and the second grid terminal; a current diversion branch having a first end connected to the first node and a second end connected to a second node, the current diversion branch comprising a first impedance connected in series between the first end and the second end; wherein the second nodes of the first phase arrangement, the second phase arrangement, and the third phase arrangement are all connected to a three phase delta-connected set of switches, configured to be non-conducting in a first state and conducting in a second state; a switching arrangement arranged to control the three phase delta-connected set of switches; wherein the first state represents normal conditions on the AC grid and the second state represents a fault condition on the AC grid; wherein, on reception of a signal indicating the second state, the switching arrangement is arranged to make the 3-phase delta-connected set of switches conducting; wherein, when the three phase delta-connected set of switches is conducting, the current diversion branches are arranged to divert a portion of the fault current away from the AC grid fault location to the three phase delta-connected set of switches.

In some embodiments, the three phase delta-connected set of switches comprises: a first switch, having a first terminal connected to the second end of the current division branch of the first phase arrangement, and a second terminal, wherein the first switch is not conducting in the first state and conducting in the second state; a second switch, having a first terminal connected to the second end of the current division branch of the second phase arrangement, and a second terminal, wherein the first switch is not conducting in the first state and conducting in the second state; a third switch, having a first terminal connected to the second end of the current division branch of the third phase arrangement, and a second terminal, wherein the first switch is not conducting in the first state and conducting in the second state; wherein first terminal of the first switch is connected to the second terminal of the second switch, and the second terminal of the first switch is connected to the first terminal of the third switch; wherein first terminal of the second switch is connected to the second terminal of the third switch, and the second terminal of the third switch is connected to the first terminal of the second switch; wherein, on reception of the signal indicating the second state, the switching arrangement is arranged to make the first switch, the second switch and the third switch conducting.

Embodiments of the invention will now be described, by way of example and with reference to the accompanying drawings in which:—

When two or more electrical components are referred to as being "connected", it will be appreciated that this can mean "directly" connected or with one or more intervening components.

Figure 1A:
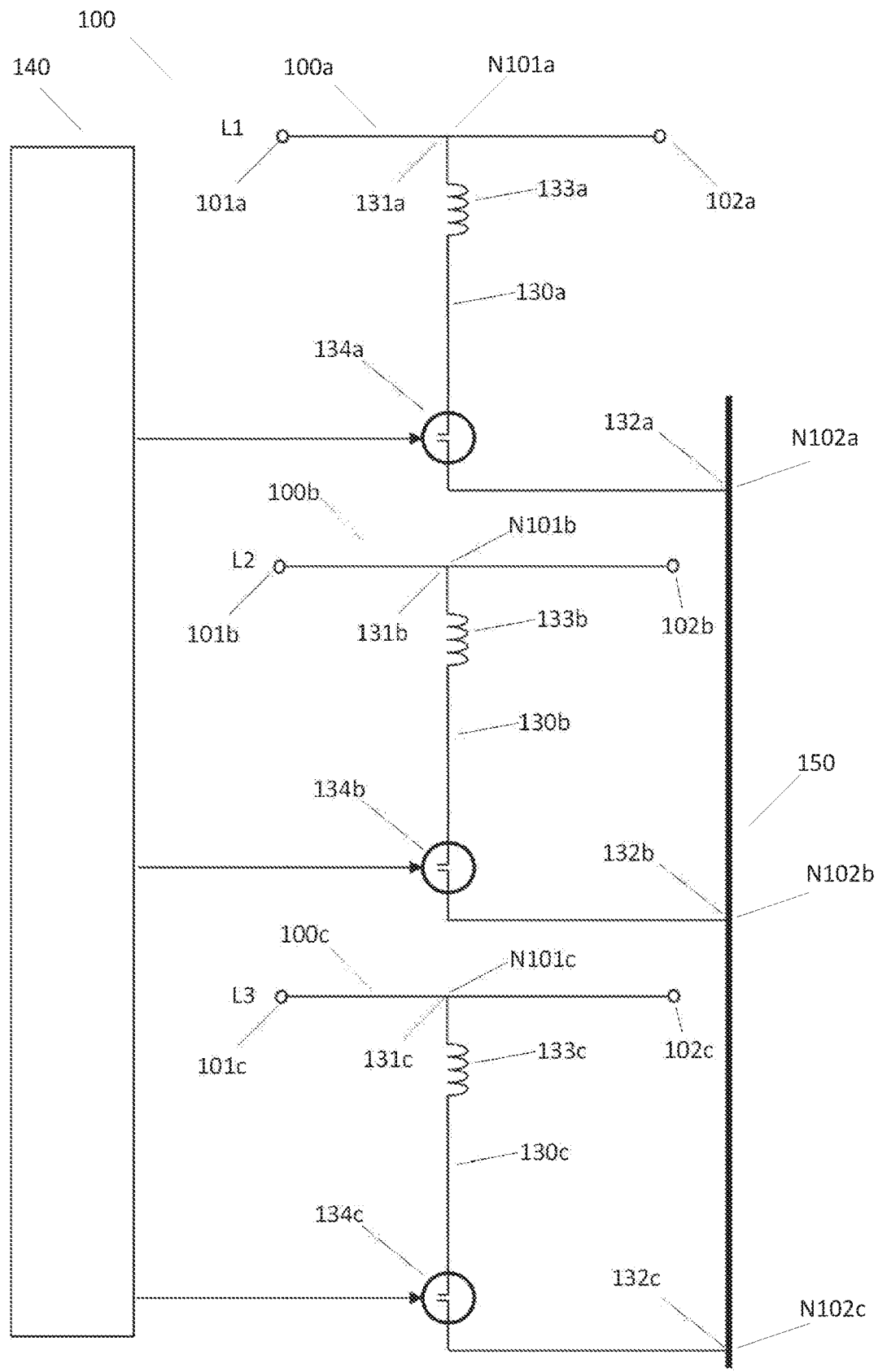
FIG. 1a shows a schematic illustration of a current sinking arrangement according to a first embodiment.

FIG. 1a shows a schematic illustration of a current sinking arrangement 100 according to a first embodiment. The current sinking arrangement 100 is arranged for connection to three phases L1, L2 and L3 of an AC grid.

The current sinking arrangement 100 comprises a first phase arrangement 100a that includes a first grid terminal 101a connectable to a node of a first phase L1 of the three phase AC grid and a second grid terminal 101a connectable to another node of the first phase L1 of the three phase AC grid. The first grid terminal 101a may be for connection of main path for voltage/current from one side of the first phase L1 of the AC grid and the second grid terminal 101b may be for connection of main path for voltage/current from other side of the first phase L1 of the AC grid.

For example, one of the first grid terminal 101a and the second grid terminal 102a may be connected to a source terminal, and the other of the first grid terminal 101a and the second grid terminal 102a may be connected to a load terminal.

The first phase arrangement bow has a first node between the first grid terminal 101a and the second grid terminal 102a shown in FIG. 1 as N101a.

The first phase arrangement bow has a current diversion branch 130a having a first end 131a connected to the first node N101a and a second end 132a connected to a second node N102a.

The current diversion branch 130a of the first phase arrangement bow has a first impedance 133a connected in series between the first end 131a and the second end 132a, and a first switch 134a connected in series between the first end 131a and the second end 132a. The first switch 134a is non-conducting (i.e. open or OFF) in a first state and conducting (i.e. closed or ON) in a second state.

The first impedance 133a in this embodiment is provided as a current limiting impedance. Embodiments are not limited to the type of first impedance 133a. For example, it could be implemented by a current limiting impedance with any conventional form. For example, the current limiter impedance could be an air-core reactor, iron-core reactor, resistor, or combinations of these elements, etc.

In other embodiments, the first impedance 133a may include just the parasitic impedance of the components and interconnections of the current diversion branch 130a.

The first switch 134a in this embodiment is a set of thyristors that are non-conducting (i.e. open) in the first state, i.e. in non-conducting state. In other embodiments, the first switch 134a could be formed by one or more fast acting switching elements, capable of switching from off state to on state within less than 1 milli-second. It may be implemented by multiple types of fast switching devices and particularly by semiconductor devices suitable for crow-bar applications, such as thyristors. Such semiconductor devices need to have the capability to conduct sufficiently large current in the second state and be capable of blocking sufficiently large voltage of the AC power system in normal and possible over voltage conditions when in the first state (not conducting).

In particular, the thyristors set can be constructed of two columns of thyristors, with each column comprising 1 or more thyristors, and the two columns arranged such that one column conducts current in one direction (half cycle), and the other column conducts current in the other direction (half cycle).

Figure 1B:
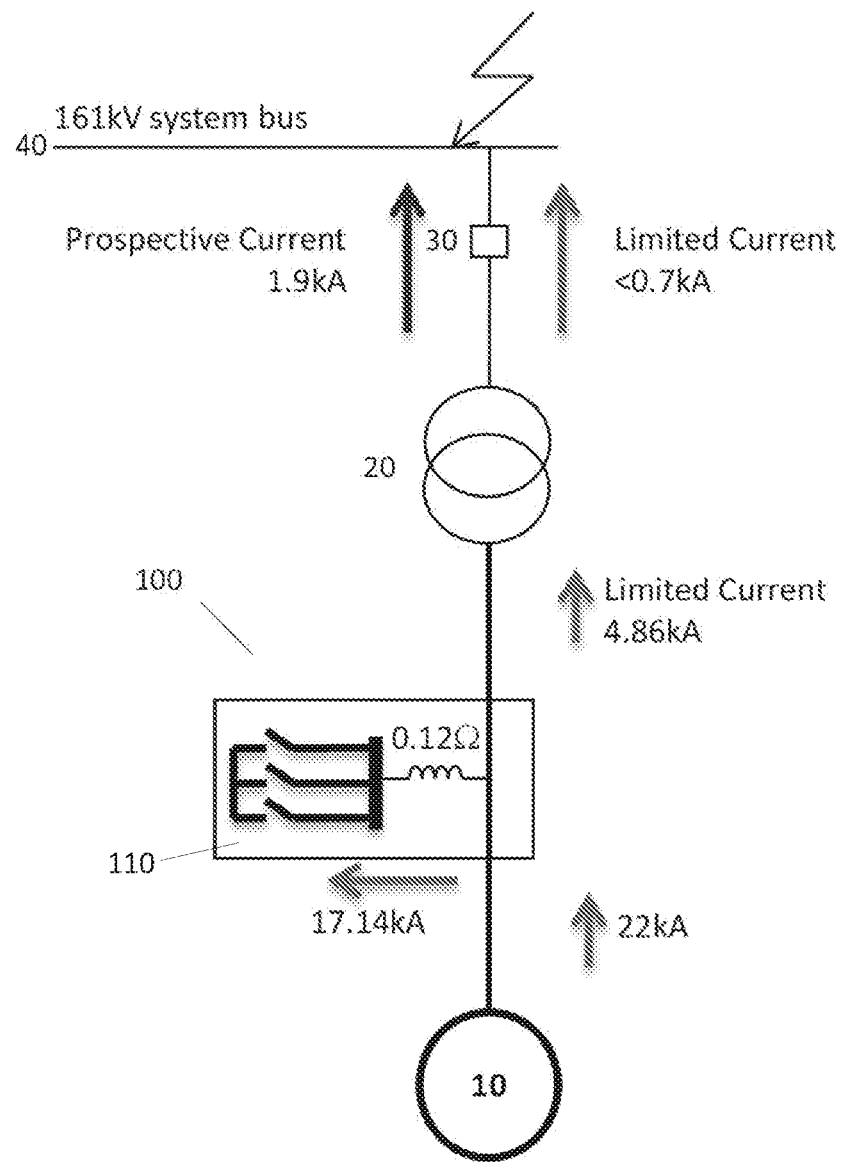
FIG. 1b shows a use case of the first embodiment.
Figure 1C:
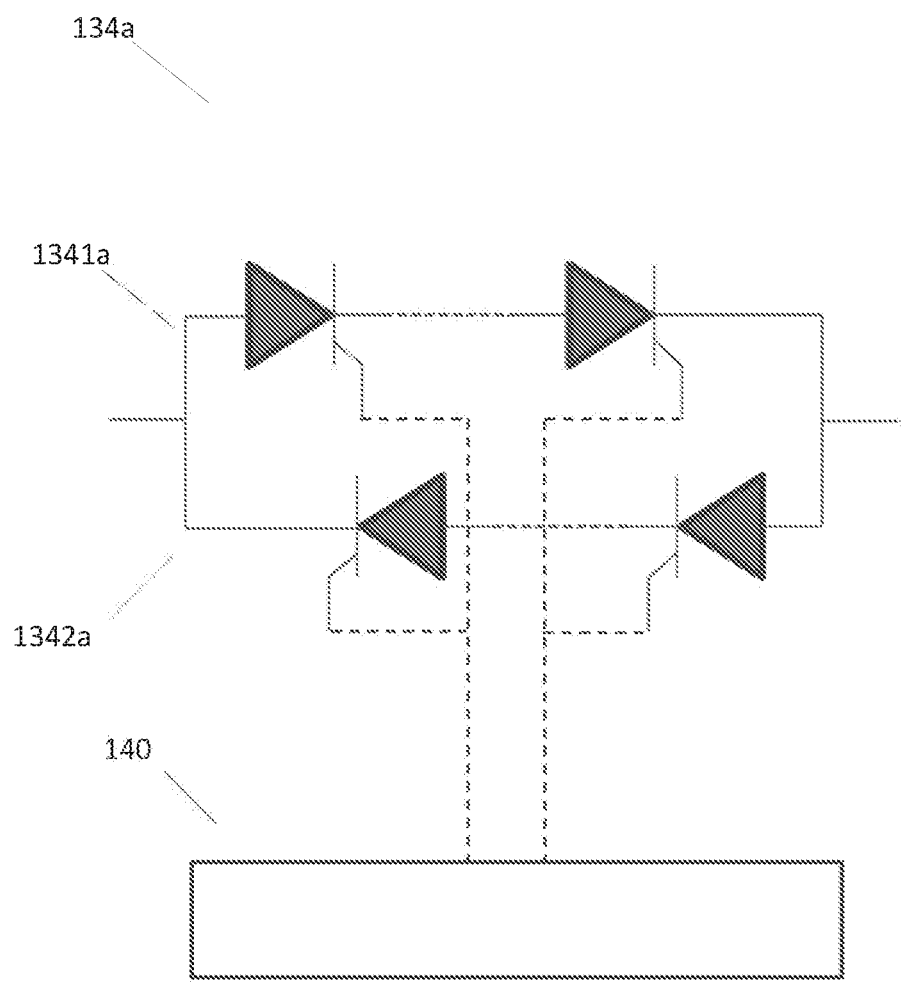
FIG. 1s shows an example switch configuration.

An example arrangement of a set of thyristors is shown in FIG. 1c. Hence, the first switch 134a is illustrated, but it will be appreciated that the second switch 134b and third switch 134c could have the same form. This has one column 1341a of two thyristors that conducts current in one direction (half cycle), and another column 1342a of two thyristors that conducts current in the other direction (half cycle). The gates of thyristors are connected to the switching mechanism. The switching mechanism can control the thyristors by supplying a gate triggering current or gate light pulses (for electrically or optically triggered thyristors respectively).

The second node N201a of the first phase arrangement bow is connected to a common floating conductor 150, which will be described in more detail later.

The current sinking arrangement 100 comprises a second phase arrangement 100b that includes a first grid terminal 101b connectable to a node of a second phase L2 of the three phase AC grid and a second grid terminal 102b connectable to another node of the second phase L2 of the three phase AC grid.

The second phase arrangement 100b has a first node N101b between the first grid terminal 101b and the second grid terminal 102b.

The second phase arrangement 100b has a current diversion branch 130b having a first 30 end 131b connected to the first node N101b and a second end 132b connected to a second node N102b.

The current diversion branch 130b of the second phase arrangement 100b has a first impedance 133b (in this case a current limiting reactor) connected in series between the first end 131b and the second end 132b, and a first switch 134b (in this case a set of thyristors as illustrated in FIG. 1c) connected in series between the first end 131b and the second end 132b. The first switch 134b is non-conducting (i.e. open or OFF) in a first state and conducting (i.e. closed or ON) in a second state.

The second node N102b of the second phase arrangement 100b is connected to the common floating conductor 150.

The current sinking arrangement 100 comprises a third phase arrangement woe that includes a first grid terminal 101c connectable to a node of a third phase L3 of the three phase AC grid and a second grid terminal 102C connectable to another node of the third phase L3 of the three phase AC grid.

The third phase arrangement woe has a first node N101c between the first grid terminal low and the second grid terminal 102C.

The third phase arrangement woe has a current diversion branch 130c having a first end 131c connected to the first node N101c and a second end 132c connected to a second node N101c.

The current diversion branch 130c of the third phase arrangement woe has a first impedance 133c (in this case a current limiting reactor) connected in series between the first end 131c and the second end 132c, and a first switch 134c (in this case a set of thyristor as illustrated in FIG. 1c) connected in series between the first end 131c and the second end 132c. The first switch 134c is non-conducting (i.e. open or OFF) in a first state and conducting (i.e. closed or ON) in a second state.

The second node N101c of the third phase arrangement woe is connected to the common floating conductor iso.

Hence, it will be appreciated that in this embodiment, the first phase arrangement 100ac, the second phase arrangement 100b and the third phase arrangement 100c all have equivalent structures in this embodiment. However, embodiments of the invention are not limited to this.

As noted above, the second nodes N102a, N102b, N101c of the first phase arrangement bow, the second phase arrangement 100b, and the third phase arrangement 100c are all connected to the common floating conductor iso.

The common floating conductor 150 in this embodiment is implemented as metallic busbar (e.g. made of copper or aluminium) that is isolated from ground. In other embodiments, the common floating conductor 150 could be made from any suitable conductor, e.g. a set of connected conducting cables (e.g. made of copper or aluminium).

The current sinking arrangement 100 also comprises a switching arrangement 140 arranged to control the first switch 134a of the first phase arrangement bow, the first switch 134b of the second phase arrangement 100b, and the first switch 134c of the third phase arrangement woe.

In the first state (e.g. normal conditions), current flows between the grid terminals of the respective first phase arrangement bow, second phase arrangement 100b and third phase arrangement woe, and current does not flow in the current diversion branches 100a, 100b, 100c. In general terms, the "first state" is a state in which the first switches 134a, 134b, 134c are non-conducting or open (switched OFF).

On reception of a signal indicating the second state, the switching arrangement 140 is arranged to rapidly transition the first switch 134a of the first phase arrangement bow, the first switch 134b of the second phase arrangement 100b, and the first switch 134c of the third phase arrangement 100 to conducting state (switching these switches ON).

Hence, when the first switches 134a, 134b, 134c are in the second state (i.e. conducting or closed), the current diversion branches 100a, 100b, 100c are arranged to divert current away from the three phases of the AC grid to the common floating conductor 150. Hence, the current sinking arrangement 100 acts to reduce the current flowing between the grid terminals of the respective first phase arrangement bow, second phase arrangement 100b and third phase arrangement woe, e.g. to reduce the current flowing from 101a to 101a or vice versa, and similarly for the other two phases.

The amount of the current reduction depends on the relative value of the first impedances 133a, 133b, 133c relative to the impedances of the AC grid (not shown in FIG. 1a).

Hence, the combination of the first impedances 133a, 133b, 133c and the grid impedance act as a current divider. This current-divider determines how much current is sinked to the current diversion branches when the first switches 134a, 134b, 134c are closed, depending on the ratio of the first impedances 133a, 133b, 133c and the grid impedances. By choosing appropriate values of first impedances 133a, 133b, 133c, more or less current can be diverted away from the three phases of the AC grid to the common floating conductor 150.

Once the fault has cleared by the AC grid's protection system, the switching mechanism 140 can revert the first switches 134a, 134b, 134c to the first state, i.e. non-conducting or open (switched OFF). When the first switches 134a, 134b, 134c are thyristor sets, this is done by turning off the gate triggering current or the gate light pulses (for electrically or optically triggered thyristors respectively). The thyristors will stop conducting current in the diverting path when they become reverse-biased, i.e. one column (e.g. 1341a in FIG. 1c) will already be reversed bias, and the other column (e.g. 1342a in FIG. 1c) will become reverse biased at the next current zero crossing in the diverting path.

As discussed, the common floating conductor 150 in this embodiment is implemented as metallic busbar that is isolated from ground. As mentioned, more generally, the common floating conductor 150 could be made from any suitable conductor that is isolated from ground and that is properly sized (e.g. with appropriate cross section) to carry the diverted current when the first switches 134a, 134b, 134c are in the second state (i.e. closed).

It is noted that an alternative to using a common floating conductor 150 would be to connect the second ends of the current diversion branches to ground. For a three phase arrangement, if the second ends of the current diversion branches are grounded or held at low potential, then the first switches will suffer from full exposure to high transition over-voltages such as lightning impulses or switching impulses. A common floating conductor enables exposure to significantly reduced over-voltages. This leads to a reduced component count, lower cost, and higher reliability.

The use of a common floating conductor (compared to a grounded one) also avoids injection of large diverted current during fault current limiting operation from the grid into ground. Such injection can cause raising of ground potential and should be avoided.

Furthermore, during a single phase to earth fault—an isolated bar arrangement will allow the first switches to be exposed to phase to earth potential as the worst case in a high impedance grounded system. A grounded bar for comparison can cause the switches to be exposed to phase to phase voltage (i.e. square root of 3 times higher). Once again, the floating bar arrangement leads to reduced component count, lower cost, and higher reliability.

The current sinking arrangement 100 of this (or any of the herein described embodiments) may comprise a control mechanism (not shown in FIG. 1) arranged to detect a fault condition. The control mechanism may be arranged to output one or more signals indicating a fault. For example, in this embodiment, the control mechanism may send signals that indicate the presence and/or absence of a fault to the switching mechanism. Depending on how the various switches are arranged, the control mechanism may send a different number of signals.

In addition, the current sinking arrangement 100 of any of the herein described embodiments may further comprises current sensors (not shown) arranged to sense the current in the source and/or load terminals as well as in the current diversion branches.

The control mechanism may be arranged to detect a fault based on a rise of the current in the source and/or load terminals, and the current sensors may be current transformers, Hall-effect sensors, Rogowski Coils, shunts etc. The fault detection system could be based on the AC circuit current in the source and/or load terminals and/or the AC circuit current rate of change. For example, a current sensor could be used to detect an increase in the AC current in the source and/or load terminals. For example, if the AC circuit current rises over 10-20% above the maximum normal level, and/or if the rate of change rises over 10-20% above the maximum normal level, a fault is detected. Any higher derivatives of the current can also be used (e.g., second derivative of current). A combination of these conditions may be used for detection as well.

In some embodiments, a control mechanism can be arranged to detect a fault based on a received signal from an external system (e.g. a remote fault detection system), an arc detection system and/or based on the reception of an operator command.

In some embodiments, an arc detector forms part of the control mechanism for the switching arrangement 140. In particular, on detection of an arc, the control mechanism is arranged to send a signal to the switching arrangement 140 indicating an arc fault condition.

The switching arrangement 140 may be powered by various arrangements. For example, the power for switching arrangement 140 can be harvested from the grid it protects, e.g. by suitable isolation transformers for each phase, secondary coils of which are connected to electronic measurement/regulation/energy storage devices for providing an auxiliary power supply and voltage measurement. These devices may be designed to provide auxiliary power supply for all control, measurement, fault detection and interface circuits.

As noted above, the first switch 134a may comprise semiconductor devices capable of conducting high currents associated with short circuit conditions in the grid for a short period of time, when in their conducting state, and are capable of withstanding the AC grid's voltage including over voltages when in their non-conducting state, and is capable of transitioning from non-conducting to conducting state within less than 1 millisecond.

An example use of a current sinking arrangement 100 according to the first embodiment will now be described with reference to FIG. 1b.

In particular, FIG. 1b shows a single line diagram representation of a current sinking arrangement 100 as illustrated schematically in FIG. 1s arranged between a generator and the grid.

In the illustration, the current diversion branches 130a, 130b, 130c (not shown in FIG. 1b) each have a first impedances 133a, 133b, 133c (only one shown schematically in FIG. 1b) of 0.12Ω; and first switches—which together have been labelled as 110. The first impedances 133a, 133b, 133c in this example are provided as air core reactors. In some cases it may be beneficial to design these reactors with a low quality-factor (i.e. Q, the reactance to resistance ratio). For example, they may have X/R between 3 and 5. This design choice allows lower cost and size compared to commonly used reactors, and is suitable for this application due to the fact that only very rarely would current flow through these reactors. Furthermore, the low quality factor allows the generator to transition from sub-transient fault conditions to steady state fault condition more rapidly, thereby reducing the duration of high sub-transient currents from the generator.

One set of grid terminals 101 of the current sinking arrangement 100 is connected to the 3-phase output of a generator 10. The generator operates at 22 kV and generates power of 150 MVA. The other set of grid terminals 102 is connected to a step up transformer 20. The transformer 20 is raises the generator voltage to 161 kV, ultimately providing the generated power to system bus 40 via a circuit breaker 40. The system bus 40 may be driven by additional similar generators.

In this example, the generator 10 has a sub-transient impedance of 15%. Its normal current is about 4 kA, and its available sub-transient fault current is 26.2 kA. Therefore, its sub-transient impedance is 0.4855Ω. The 22 kV/161 kV transformer 20 has a 160 MVA rating and 14% impedance. Therefore its short circuit impedance (referred to its 22 kV side) is 0.423Ω. The current sinking arrangement 100 has negligible series impedance between its grid terminals 101 and 102.

When a short circuit occurs on the system bus 40 (e.g. a 3-phase short circuit)—the generator 10 initially drives fault current in the sub-transient regime. Once the control mechanism detects a current rise, which is sufficient to trigger the current sinking arrangement 100, the switches 110 will turn ON, and introduce a diverting path for the generator current through the reactors 111. The current from the generator will be divided into two portions, according to the impedance ratio between the transformer impedance and the sinking arrangement reactors impedance 111. In this example—the overall current from the generator will be 22 kA. The current that will be sunk by the sinking arrangement will be 17.14 kA and the limited current that will be driven to the system bus 40 will be only 4.86 kA (on the 22 kV side) or less than 0.7 kA on the 161 kV side. This demonstrates the ability of the sinking arrangement to prevent most of the fault current from being driven into the system bus, thereby allowing equipment connected to the system bus to be exposed to a fraction of the available fault current.

It will be appreciated by those skilled in the art, that this current limiting method enables the grid protection system to operate normally, since the fault current is limited and not interrupted. Furthermore, when the reactors 111 are implemented with low quality-factor, the fault current from the generator 10 will reduce rapidly to transient or to steady state, thereby enabling the sinking arrangement 100 to keep its switches 110 turned ON until the fault is cleared by the grid protection. It will be appreciated that the current sinking arrangement may include means to measure power flow direction through the device (with suitable voltage sensors and current sensors). In case the power flows from terminal 102 to the diversion branch—the control mechanism will turn off switches 110.

Figure 2:
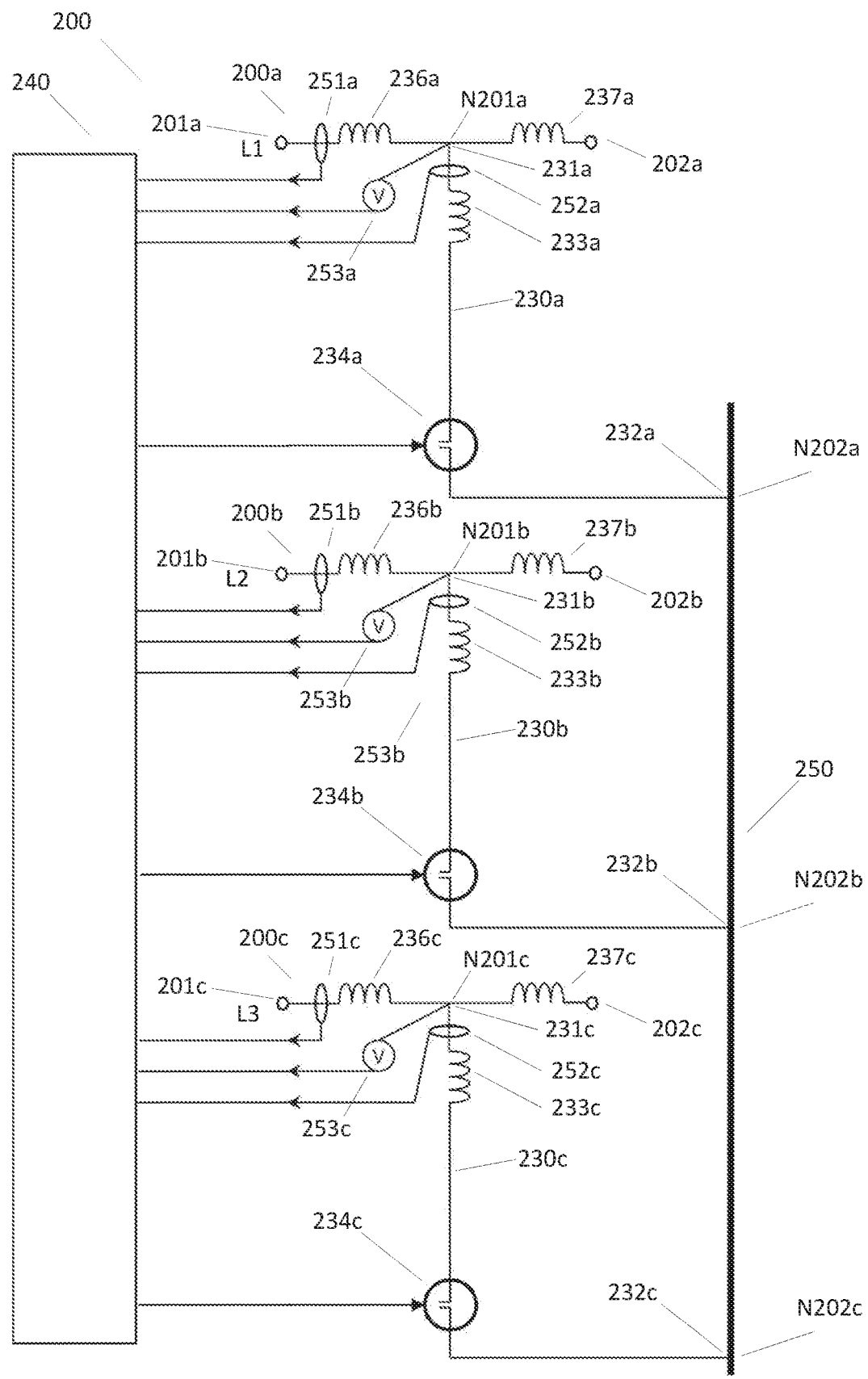
FIG. 2 shows a schematic illustration of a current sinking arrangement according to a second embodiment.

FIG. 2 shows a schematic illustration of a current sinking arrangement 200 according to a second embodiment of the invention. The current sinking arrangement 200 is arranged for connection to three phases L1, L2 and L3 of an AC grid.

As for the first embodiment, the current sinking arrangement 200 comprises first, second and third phase arrangements 200a, 200b, 200c. The first phase arrangement 200a includes a first grid terminal 201a connectable to a node of a first phase L1 of the three phase AC grid and a second grid terminal 202a connectable to another node of the first phase L1 of the three phase AC grid.

The first phase arrangement 200a has a first node between the first grid terminal 201a and the second grid terminal 202a shown in FIG. 2 as N201a.

The first phase arrangement 200a has a current diversion branch 230a having a first end 231a connected to the first node N201a and a second end 232a connected to a second node N202a. The current diversion branch 230a of the first phase arrangement 200a has a first impedance 233a connected in series between the first end 231a and the second end 232a, and a first switch 234a connected in series between the first end 231a and the second end 232a. The first switch 234a is not conducting (open or OFF) in a first state and conducting (closed or ON) in a second state.

The first impedance 233a in this embodiment is provided as a current limiting impedance, and the first switch 234a is implemented as a set of thyristors, for example a set of thyristors is shown in FIG. 1c. However, other embodiments could implement the first impedance 233a and/or the first switch 234a using different components, for example any of those discussed in relation to the first embodiment.

The second node N202a of the first phase arrangement 200a is connected to a common floating conductor 250.

Additionally, the first phase arrangement 200a comprises a second impedance 236a connected in series between the first grid terminal 201a and the first node N201a, and a third impedance 237a connected in series between the first node N201a and the second grid terminal 202a.

The second and third impedances 236a, 237a in this embodiment are provided as current limiting impedances. However, as for the first impedance 233a, they could be implemented using different components, and could be any of the types of impedances mentioned in relation to the first embodiment. For example, as for the first impedance 233a, second and third impedances 236a, 237a may include just the parasitic impedances of interconnections of the current sinking arrangement 200, or they may represent the inherent impedances of the grid itself, or combinations of parasitic impedances and grid impedances. For clarity, the grid impedances may include impedances of transformers, cables, overhead lines etc.

The first phase arrangement 200a also comprises a first current sensor 251a between the second impedance 236a and the first grid terminal 201a, and a second current sensor 252a between the first node N201a and the first impedance 233a.

The first current sensor 251a is provided to detect the current at the first grid terminal 201a. Hence, in the first state, the first current sensor 251a detects the current between the first grid terminal 201a and the second grid terminal 202a. In other embodiments, the first current sensor 251a may be provided at any location in the current sinking device 200 so as to detect the current between the first grid terminal 201a and the second grid terminal 202a. In other words, the first current sensor 251a need not be located exactly in the position as shown in FIG. 2.

The first current sensor 251a may be any suitable current sensor. For example, the first current sensor 251a may be a current transformer, a Hall effect sensor, a shunt, or a Rogowski coil.

The second current sensor 252a is provided to detect the current on the current diversion branch 230a. In other embodiments, the second current sensor 251a may be provided any location in the current sinking device 200 so as to detect the current on current diversion branch 230a, and need not be located exactly in the position as shown in FIG. 2. In some embodiments the second current sensor may be omitted.

The second current sensor 252a may be any suitable current sensor. For example, the second current sensor 252a may be a current transformer, a Hall effect sensor, a shunt, or a Rogowski coil, or any suitable sensor.

A voltage sensor 253a is also provided to detect the voltage at the first node N201a. The voltage will typically be measured from N201a and the common floating conductor 250. In other embodiments the voltage sensor may be provided in any location between terminals 201a and 202a.

The voltage sensor 253a may be any suitable voltage sensor. For example, the voltage sensor 253a may be a voltage transformer, a resistive divider, a capacitive divider etc. In some embodiments the voltage sensor may be omitted.

The first current sensor 251a, second current sensor 252a and voltage sensor 253a are connected to a switching arrangement 240. In this embodiment, the switching arrangement 240 controls first switch 234a based on current and voltage data provided by the first current sensor 251a, second current sensor 252a, and voltage sensor 253a, as discussed in more detail below.

The second and third phase arrangements 200b and 200c of this embodiment have equivalent structures to the first phase arrangement 200a, and are shown in FIG. 2 with corresponding reference numerals.

In other words, the second and third phase arrangements 200b, 200c each have a current diversion branch 230b, 230c with a first end 231b, 231c connected to the first node N201b, N201c and a second end 232b, 232c connected to the common floating conductor 250, with the current diversion branch 230b, 230c comprising the first impedance 233b, 233c (e.g. a current limiting impedance) and the first switch 234b, 234c (e.g. a set of thyristors).

The second and third phase arrangements 200b, 200c also each have a second impedance 236b, 236c (e.g. a current limiting impedance) connected in series between the first grid terminal 201b, 201C and the first node N201b, N201c; and a third impedance 237b, 237c (e.g. a current limiting impedance) connected in series between the first node N201b, N201c and the second grid terminal 202b, 202C.

The second and third phase arrangements 200b, 200c also each comprise a first current sensor 251b, 251c between the second impedance 236b, 236c and the first grid terminal 201b, 201C; and a second current sensor 252b, 252c between the first node N201b, N201c and the first impedance 233b, 233c. A voltage sensor 253b, 253c is also provided to detect the voltage at the first node N201b, N201c.

Based on the data from the first and second current sensors and the voltage sensor in the first, second and third phase arrangements 200a, 200b, 200c, the switching arrangement 240 controls first switches 234a, 234b, 234c. In other words, the combination of the first and second current sensors and the voltage sensor in the first, second and third phase arrangements 200a, 200b, 200c acts as a control mechanism for the current sinking arrangement 200. In some embodiments the switching arrangement 240 may send a command signal to switches 234a, 234b, and 234c simultaneously to move from the first state (not conducting) to the second state (conducting) based on current and/or voltage sensors of just one of the phases.

In some embodiments, the switching arrangement 240 may send a command signal to switches 234a, 234b, and 234c simultaneously to move from the second state (conducting) to the first state (not conducting) based on current and/or voltage sensors of just one of the phases, or based on a reading from the sensors of all 3 phases.

Hence, when the first switches 234a, 234b, 234c are in the second state (i.e. closed or conducting), the current diversion branches 200a, 200b, 200c are arranged to divert current away from the three phases of the AC grid to the common floating conductor 150.

It will be appreciated that there are various types of faults that can occur, and that different data from the first and second current sensors and the voltage sensor (either alone or in combination) may be used to detect a fault. For example, if the AC circuit current rises over 10-20% above the maximum normal level, and/or if the rate of change rises over 10-20% above the maximum normal level, a fault is detected. Any higher derivatives of the current can also be used (e.g., second derivative of current). A combination of these conditions may be used for detection as well.

The second nodes N202a, N202b, N202c of the first phase arrangement 200a, the second phase arrangement 200b, and the third phase arrangement 200c are all connected to the common floating conductor 250. The common floating conductor 150 in this embodiment is implemented as metallic busbar that is isolated from ground. However, in other embodiments, it could be implemented as any suitable conductor that is isolated from ground.

The general operation of the second embodiment is the same as for the first embodiment. In other words, in normal conditions, current flows between the grid terminals of the respective first phase arrangement 200a, second phase arrangement 200b and third phase arrangement 200c, and current does not flow in the current diversion branches 200a, 200b, 200c.

On reception of a signal indicating the second state, the switching arrangement 240 is arranged to close (i.e. rapidly transition to conducting state) the first switch 234a of the first phase arrangement 200a, the first switch 234b of the second phase arrangement 200b, and the first switch 234c of the third phase arrangement 200. When the first switches 234a, 234b, 234c are in the second state, the current diversion branches 200a, 200b, 200c are arranged to divert current away from the three phases of the AC grid to the common floating conductor 250.

Hence, if data from first and second current sensors and the voltage sensor (either alone or in combination) indicates a fault condition, then the switching arrangement 240 controls first switches 234a, 234b, 234c to close. This will reduce the current flowing between the grid terminals of the respective first phase arrangement 200a, second phase arrangement 200b and third phase arrangement 200c.

In this embodiment, the amount of the current reduction depends on the relative value of the first impedances 233a, 233b, 233c relative to the impedances of the AC grid (not shown) and the values of the second impendences 236a, 236b, 236c or third impendences 237a, 237b, 237c (depending on the fault location).

To clarify, if the fault happens on the side of grid terminal 201a, the current division ratio will be determined by the relative values of the sum of AC grid impedance (not shown) and the values of the second impendences 236a, 236b, 236c compared to the first impedances 233a, 233b, 233c. If the fault happens on the side of grid terminal 202a, the current division ratio will be determined by the relative values of the sum of AC grid impedance (not shown) and the values of the third impendences 237a, 237b, 237c compared to the first impedances 233a, 233b, 233c.

Hence, the combination of the first impedances 233a, 233b, 233c, grid impedances and the second impendences 236a, 236b, 236c or the third impendences 237a, 237b, 237c acts as a current divider. The current division in this situation depends on the current divider provided by the ratio of first impedances 233a, 233b, 233c to the sum of the second impedances 236a, 236b, 236c and grid impedance; or the ratio of first impedances 233a, 233b, 233c to the sum of the third impedances 237a, 237b, 237c and grid impedance (depending on the fault location).

This current divider determines how much current flows in the current diversion branches when the first switches 234a, 234b, 234c are closed. By choosing appropriate values of the impedances, more or less current can be diverted away from the three phases of the AC grid to the common floating conductor 250. Compared to the FIG. 1 embodiment, the presence of the second impedance and third impedance provides further control over the current division. It will be appreciated that in other embodiments, only one of the second impedance or third impedance need be provided.

In a variant of the second embodiment, only one of the second impedance or the third impedance need be provided. The choice of how many such impedances and their relative values depends on the location of the current sinking arrangement in the power generation system, and the type of faults that it is intended to deal with. Particularly, these impedances values or presence depends on impedances of equipment in the grid, such as transformers, cables, overhead lines and current limiting reactors installed in the grid.

Figure 3:
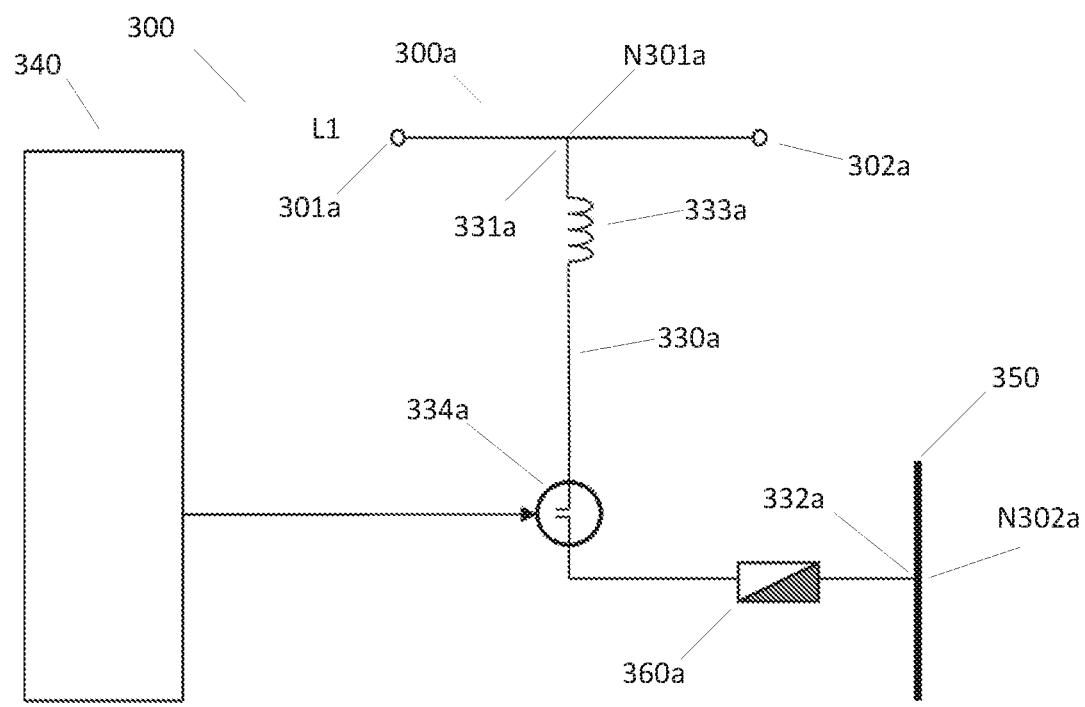
FIG. 3 shows a schematic illustration of a current sinking arrangement according to a third embodiment.

FIG. 3 shows a schematic illustration of a current sinking arrangement 300 according to a third embodiment of the invention. The current sinking arrangement 300 is arranged for connection to three phases L1, L2 and L3 of an AC grid.

As for the first and second embodiments, the current sinking arrangement 300 of the third embodiment has first, second and third phase arrangements, with current diversion branches connected to a common floating conductor 350. However, for ease of illustration, only one of the three phase arrangements is shown to show how the third embodiment differs from the first embodiment. This is illustrated as 300a for phase L1.

The phase arrangement 300a includes a first grid terminal 301a connectable to a node of a phase of the three phase AC grid and a second grid terminal 302a connectable to another node of that phase of the AC grid.

The phase arrangement 300a has a first node between the first grid terminal 301a and the second grid terminal 302a shown in FIG. 3 as N301a.

The first phase arrangement 300a has a current diversion branch 330a having a first end 331a connected to the first node N301a and a second end 332a connected to a second node N302a. The current diversion branch 330a of this phase arrangement 300a has a first impedance 333a connected in series between the first end 331a and the second end 332a, and a first switch 334a connected in series between the first end 331a and the second end 332a. The first switch 334a is open (not conducting) in a first state and closed (conducting) in a second state.

The second node N302a of this phase arrangement 300a is connected to a floating conductor 350 that is common for the phase arrangements of the other phases (not shown in FIG. 3).

Additionally, the current diversion branch 330a of this phase arrangement 300a has a fuse 360. In this embodiment, the fuse 360a is provided between the first switch 334a and the common floating conductor 350.

The third embodiment can therefore be considered to be equivalent to the first embodiment, but with the addition of the fuse 360a for each of the three phase arrangements (only one shown in FIG. 3).

The fuse 360a in this embodiment is implemented as a high voltage fuse with $I^2t$ rating that is lower than the $I^2t$ rating of the first switch 334a. In other embodiments, the fuse 360a could be located at a location on the current diversion branch.

The general operation of the third embodiment is the same as for the first embodiment. In other words, in normal conditions, current flows between the grid terminals of the respective phase arrangements.

On reception of a signal indicating the second state, the switching arrangement 340 is arranged to close the first switches of the phase arrangements, diverting current away from the three phases of the AC grid to the common floating conductor 350.

In this embodiment, the fuse for each phase arrangement is provided for backup protection for any failure of the fault detection/control/interface means in the switching arrangement 340 or its connection to the switches. It should be noted that, in practical embodiments, blowing of these fuses will be after a sufficient time that allows for reduction of the fault current from devices such as connected generators (e.g. as they move from sub-transient regime to transient regime or to steady state regime) or clearing of the faulted location in the grid by the grid's switchgear.

One or more fuses could be added to the current diversion branches of any herein described embodiment.

Figure 4:
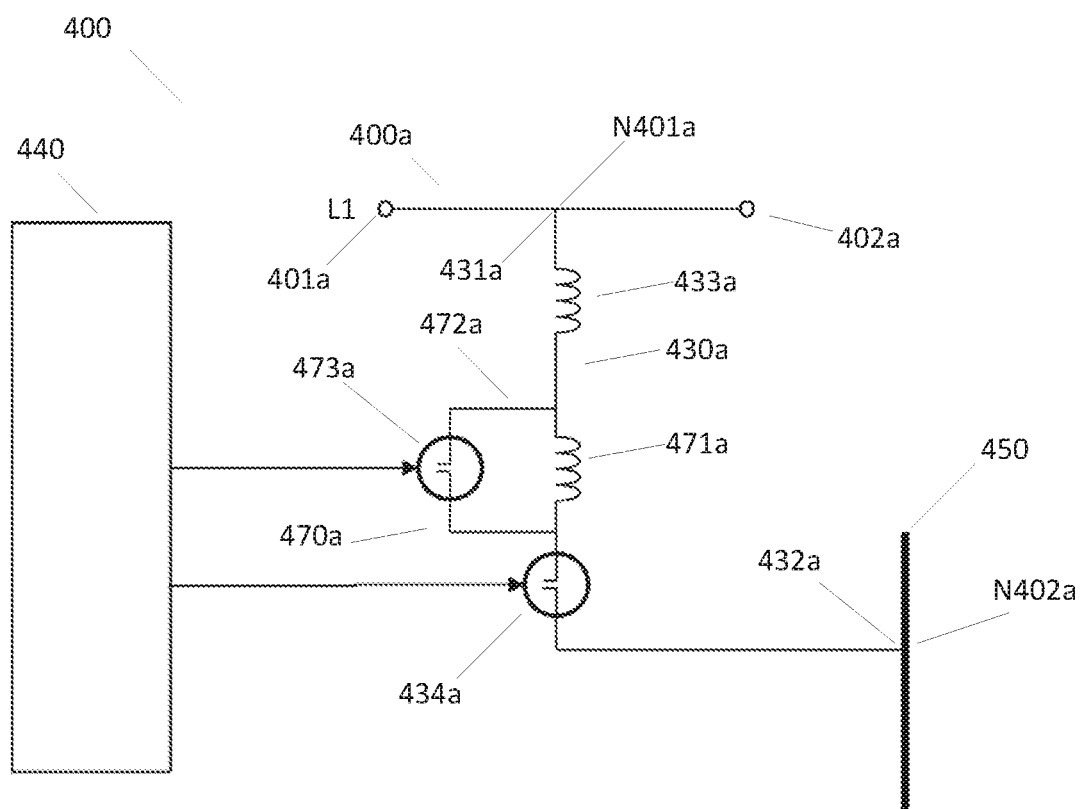
FIG. 4 shows a schematic illustration of a current sinking arrangement according to a fourth embodiment.

FIG. 4 shows a schematic illustration of a current sinking arrangement 400 according to a fourth embodiment of the invention. The current sinking arrangement 400 is arranged for connection to three phases L1, L2 and L3 of an AC grid.

As for the first to third embodiments, the current sinking arrangement 400 of the fourth embodiment has first, second and third phase arrangements, with current diversion branches connected to a common floating conductor 450. However, for ease of illustration, only one of the three phase arrangements is shown to show how the third embodiment differs from the first embodiment. This is illustrated as 400a for phase L1.

The phase arrangement 400a includes a first grid terminal 401a connectable to a node of a phase of the three phase AC grid and a second grid terminal 402a connectable to another node of that phase of the AC grid. The phase arrangement 400a has a first node between the first grid terminal 401a and the second grid terminal 402a shown in FIG. 4 as N401a.

The first phase arrangement 400a has a current diversion branch 430a having a first end 431a connected to the first node N401a and a second end 432a connected to a second node N402a. The current diversion branch 430a of this phase arrangement 400a has a first impedance 433a connected in series between the first end 431a and the second end 432a, and a first switch 434a connected in series between the first end 431a and the second end 432a. The first switch 434a is open in a first state and closed in a second state. The first switch 434a is controlled by a switching arrangement 440.

The second node N402a of this phase arrangement 400a is connected to a floating conductor 450 that is common for the phase arrangements of the other phases (not shown in FIG. 4).

Additionally, the current diversion branch 430a of this phase arrangement 400a has a bypass impedance 471a connected in series between the first end 431a and the second end 432a, and a bypass branch 472a connected in parallel with the bypass impedance 471a. The bypass branch 472a comprises a second switch 473a.

The bypass impedance 471a in this embodiment is provided as a current limiting reactor. Embodiments are not limited to the type of bypass impedance 471a. For example, it could be implemented by current limiting impedance with any conventional form. For example, it could be implemented by an air-core reactor, iron-core reactor, resistor, or combinations of these elements, etc.

The second switch 473a in this embodiment is implemented as a semiconductor switch, e.g. a set of thyristors as described in the first embodiment for the first switch. In other embodiments, the second switch 473a may be implemented in other ways, e.g. any type of fast switching device suitable for crow-bar applications.

It will be appreciated that when the second switch 473a is closed (conducting, or ON) the bypass impedance 471a is electrically bypassed. The bypass branch 472a, second switch 473a and bypass impedance 471a form a bypass arrangement 470a.

The fourth embodiment can therefore be considered to operate similarly to the first embodiment, but with the addition of the bypass arrangement 470a for each of the three phase arrangements (only one shown in FIG. 4).

In normal conditions, current flows between the grid terminals of the respective phase arrangements. On reception of a signal indicating the second state, the switching arrangement 440 is arranged to make the first switches of the phase arrangements conducting, diverting current away from the three phases of the AC grid to the common floating conductor 450.

On reception of the signal indicating the second state, the switching mechanism 440 is further arranged to selectively make the second switches of the phase arrangements conducting or non-conducting so as to vary an amount of current diverted away from the three phases of the AC grid in the second state. In other words, in the second state, the switching mechanism 440 closes the first switches, and selectively opens or closes the second switches.

Considering phase arrangement 400a shown in FIG. 4, in the situation in which the second switch 473a is conducting (i.e. closed), then the bypass impedance 471a is electrically bypassed. Hence, with the bypass impedance 471a being electrically bypassed, the amount of the current reduction depends on the relative value of the first impedances of each of the phase arrangements relative to the impedances of the AC grid (not shown). Hence, the current division in this situation depends on a current divider provided by the ratio of first impedances and the grid impedance.

However, in the situation in which the second switch 473a is non-conducting (i.e. open), then the bypass impedance 471a is not electrically bypassed. Hence, the amount of the current reduction depends on the relative value of the sum of the first impedance and the bypass impedance of each of the phase arrangements relative to the impedances of the AC grid (not shown). Hence, the current division in this situation depends on a current divider provided by the ratio of the combination of first impedances and the bypass impedance, and the grid impedance.

Hence, the selective operation of the bypass arrangement (i.e. the current diversion branch either has the effect of the bypass impedance or not) provides a variable current divider.

By choosing appropriate values of the impedances, more or less current can be diverted away from the three phases of the AC grid to the common floating conductor 450 when the second switches are conducting/non-conducting.

This selective current division provides for flexibility in dealing with a number of different faults.

Further flexibility can be provided by providing additional bypass arrangements on the current diversion branches, each having a bypass impedance and a second switch to enable the selective bypass of the bypass impedance.

The variable current divider arrangement offers several advantages. In some embodiments, there may be a need to limit the fault current to the grid in different levels, depending on the level of the available fault current, i.e. if the available fault current is large (e.g. five times the normal current), then a large amount of current needs to be diverted. In this case, the second switch will be in conducting state, so that the bypass impedance is excluded from the current diversion branch. If the available fault current is lower (e.g. two times the normal current), then a smaller amount of fault current needs to be diverted. In this case, the second switch will be in a non-conducting state, so that the bypass impedance is included in the current diversion branch.

This operating method allows for sufficient fault current to flow into the grid, thereby allowing the grid's protection system to operate in a selective manner. For clarity, the grid protection system comprises circuit breakers that are controlled by protection relays that monitor the current through the breakers and command the breakers to open once excessive current is detected. These relays therefore have to measure sufficient current in order to properly interrupt a faulted grid segment.

In another embodiment, the bypass impedance can be included (i.e. by switching) in the current diversion branch only after some time has passed from fault initiation. As explained before, generators move from sub-transient regime (with high fault current) to steady state regime (with low fault current) during a period of tens to hundreds of milliseconds. It is beneficial to allow more fault current to flow into the grid after this regime transition, again in order to allow grid protection to operate with selectivity.

Furthermore, by turning off the second switch after e.g. wo milliseconds from fault inception, thereby increasing the impedance of the diversion branch, the current in the diversion branch decreases, and potentially allows for extended duration of conduction and current diversion, eliminating the need to interrupt the fault current close to the sinking arrangement, and enabling the fault interruption to occur far from the sinking arrangement. Thus allowing most of the grid to stay energized.

Figure 5:
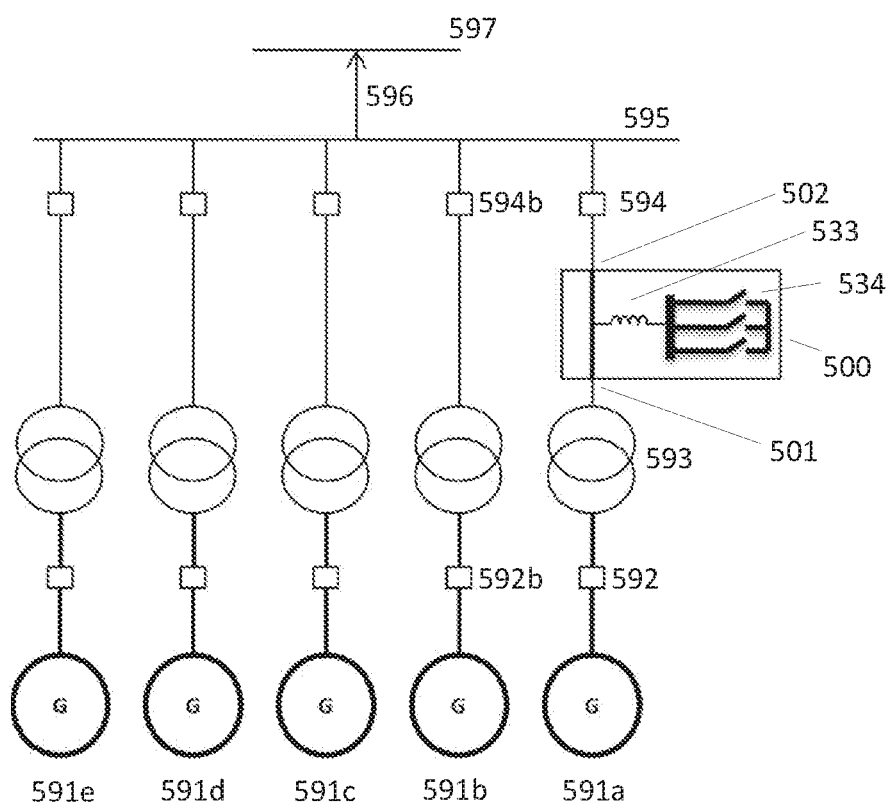
FIG. 5 shows a schematic illustration of a current sinking arrangement according to a fifth embodiment.

FIG. 5 presents another embodiment of the invention. It shows a power generation station that intends to connect into a medium voltage e.g. 24 kV distribution grid 597. Fault current considerations allow for connection of only three generators 591 out of five installed units. Using one current sinking arrangement according with this embodiment enables connection of all five generators, while keeping the short circuit current contribution to the grid at the level of contribution equivalent or less to three generators only. This embodiment comprises a 24 kV distribution grid 597, with short circuit current ratings of 6-12 kA.

Five identical generator sets are provided that are connected to a 24 kV bus 595. Each generator set comprising: a 400V, 1.4 MW 3-phase generator 591a-e, a generator circuit breaker 592, a step up transformer 593 to raise the 400V generator output to 24 kV, and a 24 kV circuit breaker 594. A medium voltage cable 596 connects the power station bus 595 with the distribution grid 597.

A single current sinking arrangement 500 is provided. One of its terminals 501 is connected to one of the step up transformers 593 and its second terminal 502 is connected to the 24 kV circuit breaker 594. The normal current through current sinking arrangement 500 is between 36-45 A. The arrangement further includes a control mechanism (not shown) for controlling the circuit breakers 594.

In this embodiment, the current sinking arrangement 500 includes an impedance 533 that is typically just the parasitic impedance of the components and interconnections. No additional reactor is required for this arrangement, since the impedances of the other grid elements is sufficient to create the desired current division. This will be apparent to the skilled person assuming for example that the transformers 593 are rated 2 MVA with short circuit impedance of 6%. In this embodiment, when the current sinking device 500 detects a fault current condition, and moves into the second state (switches 534 are conducting), the sinked current in the current diversion path of the current sinking arrangement 500 will be less than 7 kA. This diverted current can be tolerated by the thyristors comprising switches 534 for a duration of 150 msec, using commercially available thyristors.

The control mechanism (not shown) is arranged to provide commands to circuit breakers 592, 594, 592b and 594b.

Upon detection of fault current conditions by the control mechanism (not shown), the following commands are sent. This is just an example, and other sequences that achieve the same purpose are possible.

The switches 534 are turned on (move to conducting state), and at the same time commands are sent to open circuit breakers 592, 592b and 594b. After a delay of e.g. 100 milliseconds, a command is sent to open circuit breaker 594 as well.

It would be appreciated that the opening (until complete current interruption) of these circuit breakers will take tens of milliseconds, while the transfer to conduction state of the switches 534 will take less than 1 millisecond. Therefore, initially after these commands are sent, the sinking arrangement 500 provides a diverting path for current from all five generators 591a-e, thereby reducing the fault current contribution into the distribution grid 597.

After the circuit breakers 592, 592b and 594b are open (e.g. after 70 milliseconds)—only generators 591c, 591d, and 591e continue to drive current into distribution grid 597 and the current sinking arrangement 500. At this time, circuit breaker 594 is still closed and conducting current. After 100 msec from fault inception, circuit breaker 594 receives a command to open, and after e.g. 50 msec more—it interrupts the current into the sinking arrangement. At this point, only generators 591c, 591d and 591e drive fault current into the distribution grid 597. This enables the protection equipment in distribution grid 597 (not shown) to operate with full selectivity to locate the fault and clear it.

It would be appreciated, that it is possible to send a turn-off command to switches 534, in parallel with the command to open circuit breaker 594. This provides a backup protection for a failure of circuit breakers to open.

Figure 6:
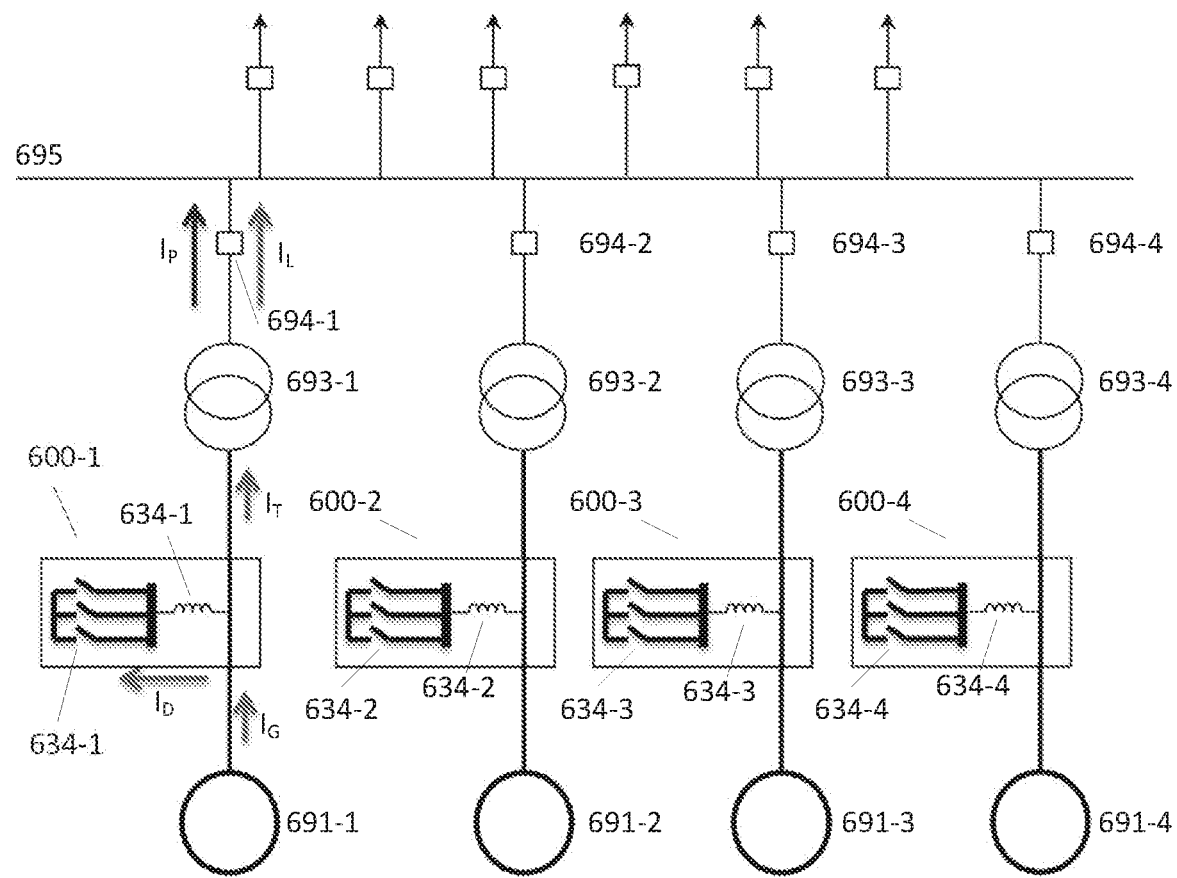
FIG. 6 shows a schematic illustration of a current sinking arrangement according to a sixth embodiment.

FIG. 6 presents schematic diagram of another embodiment of this invention. A power plant with Four generators

691-1, 691-2, 691-3, 691-4, each 22 kV output and 150 MVA power with sub-transient impedance of 15%, is attempting to connect to a 161 kV transmission grid via bus 695. Each generator's output voltage is raised to 161 kV by a step up transformer 693-1, 693-2, 693-3, 693-4, each rated 160 MVA and with 14% short circuit impedance, and connected to bus 695 via circuit breakers 694-1, 694-2, 694-3, 694-4. Since the transmission grid is already near its maximum fault current capacity in this example—there is a necessity to limit the fault current contribution from the generators. To facilitate this a current sinking arrangement 600-1, 600-2, 600-3, 600-4 is installed in series with each generator 691-4 691-2, 691-3, 691-4, with a diversion branch impedance (634-1, 634-2, 634-3, 634-4) of 0.12Ω for each phase.

It can be seen that the in the absence of the current sinking arrangement, the short circuit current contribution $I_P$ of each generator 691-1, 691-2, 691-3, 691-4 in sub-transient regime to bus 695 is about 2 kA RMS (shown for generator 691-1 in FIG. 6).

With the current sinking arrangements 600-1, 600-2, 600-3, 600-4 installed—upon detection of short circuit current, a command is sent to switches 634-1, 634-2, 634-3, 634-4 to turn them into the conducting state. It can be seen via current divider calculations, that for e.g. a 3-phase short circuit on bus 695 the current contribution $I_L$ (shown for generator 691-1 in FIG. 6) from each generator into bus 695 will be less than 0.7 kA. This represents a significant reduction in fault current contribution into bus 695.

It can also be seen that the generator sourced short circuit current $I_G$ in this case will be 19.8 kA, the diverted current ID into the sinking arrangement 600-1 will be 14.8 kA and the current $I_T$ into the transformer 693-1 will be 5 kA. This demonstrates that most of the current from the generator flows into the sinking arrangement in short circuit conditions, thereby reducing the current into the transmission network connected to bus 695.

It will be appreciated that current and voltage sensors similar to the ones described in FIG. 2, and are not shown in FIG. 6 can be used in this embodiment as well. A measurement by these sensors can be used to determine that the current driven into bus 695 is below a predefined threshold, and a command to turn off switches 634-1, 634-2, 634-3, 634-4 can be issued, to stop the current flow through the diversion branch.

Figure 7:
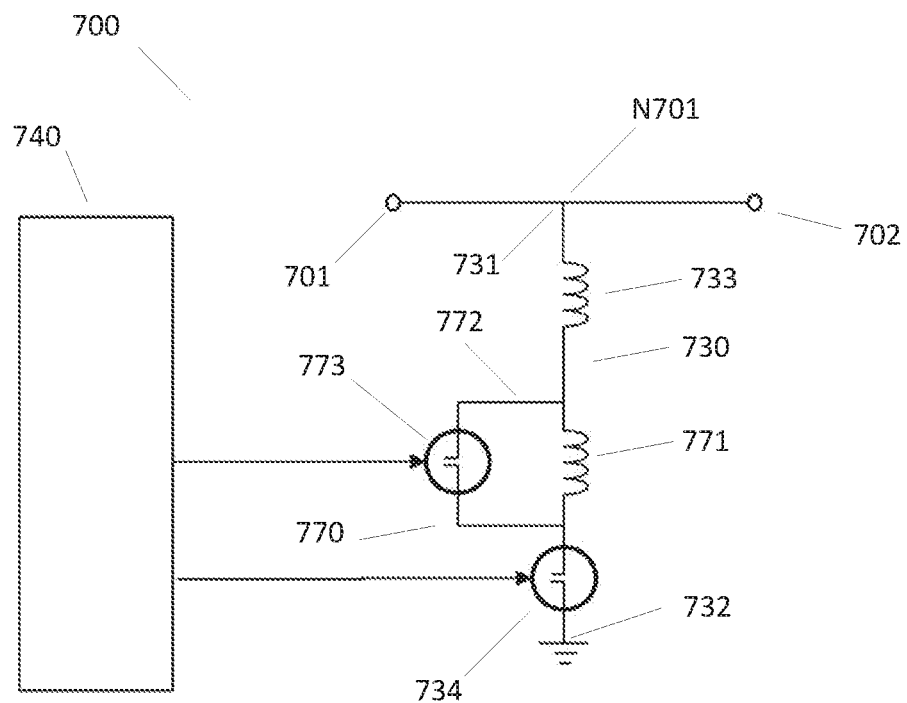
FIG. 7 shows a schematic illustration of a current sinking arrangement according to a seventh embodiment.

FIG. 7 shows a schematic illustration of a current sinking arrangement 700 according to a seventh embodiment of the invention. The current sinking arrangement 700 is arranged for connection to a single phase of an AC grid. Hence, FIG. 7 shows a single phase current sinking arrangement.

The current sinking arrangement 700 includes a first grid terminal 701 connectable to a node of the AC grid and a second grid terminal 702 connectable to another node of the AC grid. The first grid terminal 701 may be for connection of main path for voltage/current from one side of the AC grid and the second grid terminal 701 may be for connection of main path for voltage/current from other side of the AC grid.

The current sinking arrangement 700 has a first node between the first grid terminal 701 and the second grid terminal 702 shown in FIG. 7 as N701.

The current sinking arrangement 700 has a current diversion branch 730 having a first end 731 connected to the first node N701 and a second end 732 connected to ground.

The current diversion branch 730 has a first impedance 733 connected in series between the first end 731 and the second end 732, and a first switch 734 connected in series between the first end 731 and the second end 732. The first switch 734 is non-conducting (i.e. open or OFF) in a first state and conducting (i.e. closed or ON) in a second state.

The first impedance 733 in this embodiment is provided as a current limiting impedance. Embodiments are not limited to the type of first impedance 733. For example, it could be implemented by a current limiting impedance with any conventional form. For example, the current limiter reactor could be an air-core reactor, iron-core reactor, resistor, or combinations of these elements, etc.

In other embodiments, the first impedance 733 may include just the parasitic impedance of the components and interconnections of the current diversion branch 730.

The first switch 734 in this embodiment is a set of thyristors that are non-conducting (i.e. open) in the first state, i.e. in non-conducting state. In other embodiments, the first switch 734a could be formed by one or more fast acting switching elements, capable of switching from off state to on state within less than 1 milli-second. It may be implemented by multiple types of fast switching devices and particularly by semiconductor devices suitable for crow-bar applications, such as thyristors. Such semiconductor devices need to have the capability to conduct sufficiently large current in the second state and be capable of blocking sufficiently large voltage of the AC power system in normal and possible over voltage conditions when in the first state (not conducting). The example arrangement of a set of thyristors shown in FIG. 1s could be used here.

Additionally, the current diversion branch 730 has a bypass impedance 771 connected in series between the first end 731 and the second end 732, and a bypass branch 772 connected in parallel with the bypass impedance 771. The bypass branch 771 comprises a second switch 773.

The bypass impedance 771 in this embodiment is provided as a current limiting reactor. Embodiments are not limited to the type of bypass impedance 771. For example, it could be implemented by current limiting impedance with any conventional form, for example an air-core reactor, iron-core reactor, resistor, or combinations of these elements, etc.

The second switch 773 in this embodiment is implemented as a semiconductor switch, e.g. a set of thyristors as described above for the first switch 734. In other embodiments, the second switch 744 may be implemented in other ways, e.g. any type of fast switching device suitable for crow-bar applications.

It will be appreciated that when the second switch 773 is conducting (i.e. closed) the bypass impedance 771 is electrically bypassed. The bypass branch 772, second switch 773 and bypass impedance 771 form a bypass arrangement 770.

In the first state (e.g. normal conditions), current flows between the grid terminals 701 and 702, and current does not flow in the current diversion branch 730. In general terms, the "first state" is a state in which the first switch are non-conducting or open (switching OFF).

On reception of a signal indicating the second state, the switching arrangement 740 is arranged to close the first switch 734, diverting current away from the AC grid to ground.

On reception of the signal indicating the second state, the switching mechanism 740 is arranged to selectively make the second switch 773 conducting or non-conducting so as to vary an amount of current diverted away from the AC grid in the second state. In other words, in the second state, the switching mechanism 740 makes the first switch 734, and selectively opens or closes the second switch 773.

In the situation in which the second switch 773 is conducting (i.e. closed), then the bypass impedance 771 is electrically bypassed. Hence, with the bypass impedance 771 being electrically bypassed, the amount of the current reduction depends on the relative value of the first impedance to the impedance of the AC grid (not shown). Hence, the current division in this situation depends on a current divider provided by the ratio of first impedance 733 and the grid impedance.

However, in the situation in which the second switch 773 is non-conducting (i.e. open), then the bypass impedance 771 is not electrically bypassed. Hence, the amount of the current reduction depends on the relative value of the sum of the first impedance 773 and the bypass impedance 771 relative to the impedance of the AC grid (not shown). Hence, the current division in this situation depends on a current divider provided by the ratio of the combination of first impedance 734 and the bypass impedance 771, and the grid impedance.

Hence, the selective operation of the bypass arrangement 770 (i.e. the current diversion branch either has the effect of the bypass impedance or not) provides a variable current divider.

By choosing appropriate values of the impedances, more or less current can be diverted away from the three phases of the AC grid to ground when the second switch 773 is conducting/non-conducting.

This selective current division provides for flexibility in dealing with a number of different faults.

Further flexibility can be provided by providing additional bypass arrangements on the current diversion branch, each having a bypass impedance and a second switch to enable the selective bypass of the bypass impedance.

The variable current divider arrangement offers several advantages. In some embodiments, there may be a need to limit the fault current to the grid in different levels, depending on the level of the available fault current, i.e. if the available fault current is large (e.g. five times the normal current), then a large amount of current needs to be diverted. In this case, the second switch will be in conducting state, so that the bypass impedance is excluded from the current diversion branch. If the available fault current is lower (e.g. two times the normal current), then a smaller amount of fault current needs to be diverted. In this case, the second switch will be in a non-conducting state, so that the bypass impedance is included in the current diversion branch.

This operating method allows for sufficient fault current to flow into the grid, thereby allowing the grid's protection system to operate in a selective manner. For clarity, the grid protection system comprises circuit breakers that are controlled by protection relays that monitor the current through the breakers and command the breakers to open once excessive current is detected. These relays therefore have to measure sufficient current in order to properly interrupt a faulted grid segment.

In another embodiment, the bypass impedance can be included (i.e. by switching) in the current diversion branch only after some time has passed from fault initiation. As explained before, generators move from sub-transient regime (with high fault current) to steady state regime (with low fault current) during a period of tens to hundreds of milliseconds. It is beneficial to allow more fault current to flow into the grid after this regime transition, again in order to allow grid protection to operate with selectivity. Furthermore, by turning off the second switch after e.g. 100 milliseconds from fault inception, thereby increasing the impedance of the diversion branch, the current in the diversion branch decreases, and potentially allows for extended duration of conduction and current diversion, eliminating the need to interrupt the fault current close to the sinking arrangement, and enabling the fault interruption to occur far from the sinking arrangement. Thus allowing most of the grid to stay energized.

The current sinking arrangement 700 of this (or any of the herein described embodiments) may comprise a control mechanism (not shown in FIG. 7) arranged to detect a fault condition. The control mechanism may be arranged to output one or more signals indicating a fault. For example, in this embodiment, the control mechanism may send signals that indicate the presence and/or absence of a fault to the switching mechanism. Depending on how the various switches are arranged, the control mechanism may send a different number of signals.

In addition, the current sinking arrangement 700 of any of the herein described embodiments may further comprises a current sensor (not shown) arranged to sense the current in the source and/or load terminals.

The control mechanism may be arranged to detect a fault based on a rise of the current in the source and/or load terminals, and the current sensor may be a current transformer. The fault detection system could be based on the AC circuit current in the source and/or load terminals and/or the AC circuit current rate of change. For example, a current transformer could be used to detect an increase in the AC current in the source and/or load terminals. For example, if the AC circuit current rises over 10-20% above the maximum normal level, and/or if the rate of change rises over 10-20% above the maximum normal level, a fault is detected. Any higher derivatives of the current can also be used (e.g., second derivative of current). A combination of these conditions may be used for detection as well.

In some embodiments, a control mechanism can be arranged to detect a fault based on a received signal from an external system (e.g. a remote fault detection system), an arc detection system and/or based on the reception of an operator command.

Furthermore, based on the data from the control mechanism (e.g. current or voltage data), the switching mechanism 740 can selectively open or close the second switch 773 so as to vary an amount of current diverted away from the AC grid in the second state.

In addition, while the current sinking arrangement 700 is a single phase arrangement, a three phase current sinking arrangement for connection to three phases of the AC grid can be provided by using a separate single phase current sinking arrangement for each of the three phases of the AC grid.

Figure 8:
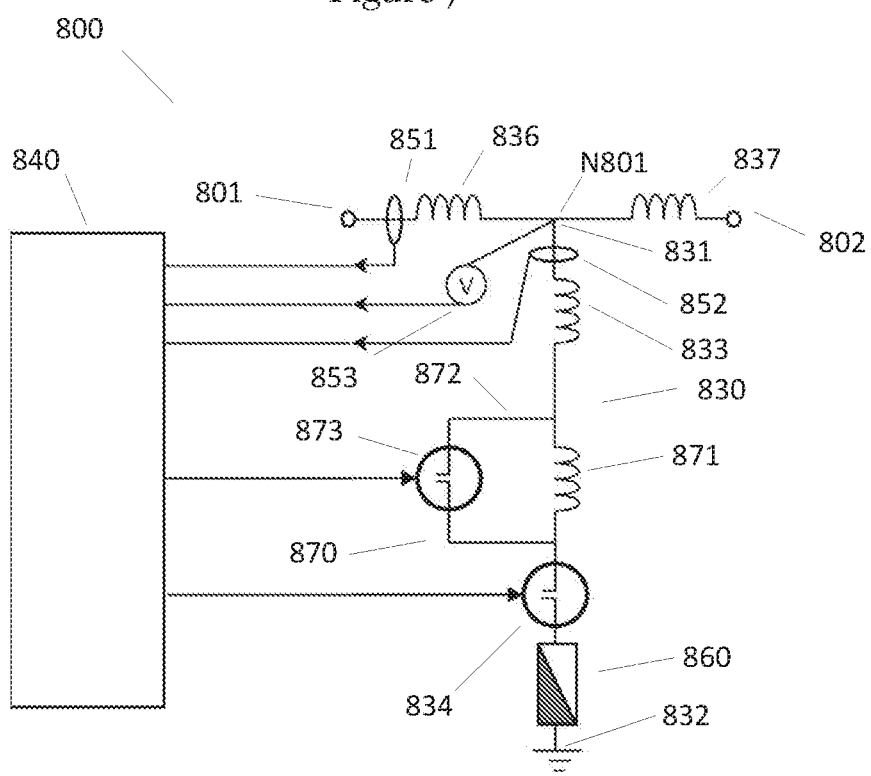
FIG. 8 shows a schematic illustration of a current sinking arrangement according to an eighth embodiment.

FIG. 8 shows a schematic illustration of a current sinking arrangement 800 according to an eighth embodiment of the invention. The current sinking arrangement 800 is arranged for connection to a single phase of an AC grid.

The current sinking arrangement 800 includes a first grid terminal 801 connectable to a node of the AC grid and a second grid terminal 802 connectable to another node of the AC grid. The first grid terminal 801 may be for connection of main path for voltage/current from one side of the AC grid and the second grid terminal 801 may be for connection of main path for voltage/current from other side of the AC grid.

The current sinking arrangement 800 has a first node between the first grid terminal 101a and the second grid terminal 802 shown in FIG. 8 as N801.

The current sinking arrangement 800 has a current diversion branch 830 having a first end 831 connected to the first node N801 and a second end 832 connected to ground.

The current diversion branch 830 has a first impedance 833 connected in series between the first end 831 and the second end 832, and a first switch 834 connected in series between the first end 831 and the second end 832. The first switch 834 is conducting (open) in a first state and non-conducting (closed) in a second state. The first switch 834 may be implemented as any of the arrangements discussed with reference to the seventh embodiment, for example, a set of thyristors is shown in FIG. 1C.

The first impedance 833 in this embodiment is provided as a current limiting impedance, and the first switch 834 is implemented as a set of thyristors. However, other embodiments could implement the first impedance 833 and/or the first switch 834 using different components, for example any of those discussed in relation to the seventh embodiment.

The current diversion branch 830 has a bypass arrangement 870 of the type described in relation to FIG. 7. Hence, the bypass arrangement 870 comprises a bypass impedance 871 connected in series between the first end 831 and the second end 832, and a bypass branch 872 connected in parallel with the bypass impedance 871. The bypass branch 871 comprises a second switch 873.

The bypass impedance 871 in this embodiment is provided as a current limiting reactor. Embodiments are not limited to the type of bypass impedance 871. For example, it could be implemented by a current limiting impedance with any conventional form. The second switch 773 in this embodiment is implemented as a semiconductor switch, e.g. a set of thyristors as described in the seventh embodiment for the first switch. In other embodiments, the second switch 773 may be implemented in other ways, e.g. any type of fast switching device suitable for crow-bar applications.

The bypass arrangement 870 operates as described above in relation to FIG. 7.

Additionally, the current sinking arrangement 800 comprises a second impedance 836 connected in series between the first grid terminal 801 and the first node N801, and a third impedance 837 connected in series between the first node N801 and the second grid terminal 802.

The second and third impedances 836, 837 in this embodiment are provided as current limiting reactors. However, as for the first impedance 833, they could be implemented using different components, and could be any of the types of impedances mentioned in relation to the seventh embodiment. Furthermore, as for the first impedance 833, second and third impedances 836, 837 could represent the inherent impedances of the illustrated parts of the current sinking arrangement 800.

The current sinking arrangement 800 also comprises a first current sensor 851 between the second impedance 836 and the first grid terminal 801, and second current sensor 852 between the first node N801 and the first impedance 833.

The first current sensor 851 is provided to detect the current at the first grid terminal 801. Hence, in the first state, the first current sensor 851 detects the current between the first grid terminal 801 and the second grid terminal 802. In other embodiments, the first current sensor 851 may be provided any location in the current sinking device 800 so as to detect the current between the first grid terminal 801 and the second grid terminal 802.

The first current sensor 851 may be any suitable current sensor. For example, the first current sensor 851 may be a current transformer, a Hall effect sensor, a shunt, or a Rogowski coil.

The second current sensor 852 is provided to detect the current on the current diversion branch 830. In other embodiments, the second current sensor 851 may be provided any location in the current sinking device 800 so as to detect the current on current diversion branch 830. In some embodiments, the second current sensor may be omitted.

The second current sensor 852 may be any suitable current sensor. For example, the second current sensor 852 may be a current transformer, a Hall effect sensor, a shunt, or a Rogowski coil.

A voltage sensor 853 is also provided to detect the voltage of the first node N801. The voltage will typically be measured from N801 and ground. In other embodiments, the voltage sensor may be provided in any location between terminals 801 and 802.

The voltage sensor 853 may be any suitable voltage sensor. For example, the voltage sensor 853 may be a voltage transformer, a resistive divider, a capacitive divider etc. In some embodiments, the voltage sensor may be omitted.

The first current sensor 851, second current sensor 852 and voltage sensor 853 are connected to a switching arrangement 840. In this embodiment, the switching arrangement 840 controls first switch 834 based on current and voltage data provided by the first current sensor 851, second current sensor 852, and voltage sensor 853, as discussed in more detail below.

Additionally, the current diversion branch 830 800 has a fuse 860. In this embodiment, the fuse 860 is provided between the first switch 834 and ground. In this embodiment, the fuse 860 is provided for backup protection for any failure of the detection/control/interface means. Variants of this embodiment need not have the fuse, or may have more than one such fuse as appropriate.

The general operation of the eighth embodiment is the same as for the seventh embodiment. In other words, in normal conditions, current flows between the grid terminals 801 and 802, and current does not flow in the current diversion branch 830.

On reception of a signal indicating the second state, which in this embodiment is based on data from the first current sensor 851, second current sensor 852, and voltage sensor 853, the switching arrangement 840 is arranged to close the first switch 834, diverting current away from the AC grid to ground.

On reception of the signal indicating the second state, the switching mechanism 840 is arranged to selectively open or close the second switch 873 so as to vary an amount of current diverted away from the AC grid in the second state.

In the situation in which the second switch 873 is conducting (i.e. closed), then the bypass impedance 871 is electrically bypassed. Hence, with the bypass impedance 871 being electrically bypassed, the amount of the current reduction depends on the relative value of the first impedance to the impedance of the AC grid (not shown) summed with the second or third impedance (depending on direction of current flow). Hence, the current division in this situation depends on a current divider provided by the ratio of first impedance 833 to the sum of the second impedance 836 and grid impedance; or the ratio of first impedance 833 to the sum of the third impedance 837 and grid impedance (depending on the fault location).

However, in the situation in which the second switch 873 is non-conducting (i.e. open), then the bypass impedance 871 is not electrically bypassed. Hence, the amount of the current reduction depends on the relative value of the sum of the first impedance 833 and the bypass impedance 871 relative to the impedance of the AC grid (not shown) and the second/third impendence 836, 837.

Hence, the current division in this situation depends on a current divider provided by the ratio of the sum of the first impedance 833 and the bypass impedance 871 to the sum of the second impedance 836 and grid impedance; or the ratio of the sum of the first impedance 833 and the bypass impedance 871 to the sum of the third impedance 837 and grid impedance (depending on the fault location).

Hence, the selective operation of the bypass arrangement 870 (i.e. the current diversion branch either has the effect of the bypass impedance or not) provides a variable current divider. Compared to the FIG. 7 embodiment, the presence of the second impedance 836 and third impedance 837 provides further control over the current division. It will be appreciated that in other embodiments, only one of the second impedance 836 or third impedance 837 need be provided.

By choosing appropriate values of the impedances, more or less current can be diverted away from the three phases of the AC grid to ground when the second switch 873 is conducting/non-conducting.

Figure 9:
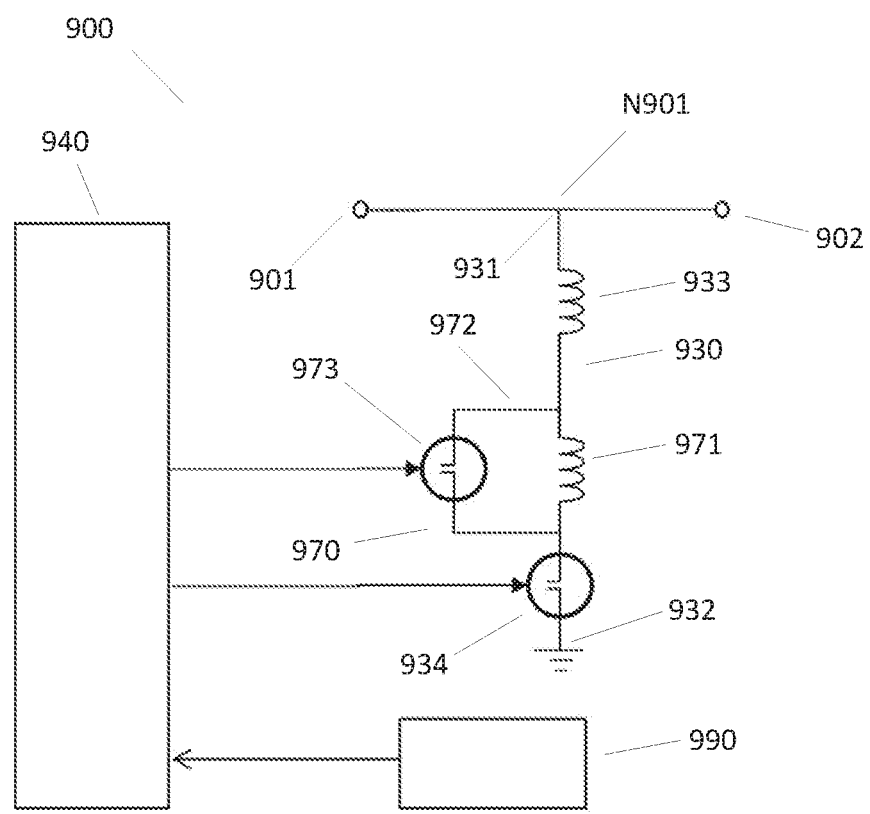
FIG. 9 shows a schematic illustration of a current sinking arrangement according to a ninth embodiment.

FIG. 9 shows a schematic illustration of a current sinking arrangement 900 according to a ninth embodiment of the invention. The current sinking arrangement 900 is arranged for connection to a single phase of an AC grid.

The current sinking arrangement 900 includes a first grid terminal 901 connectable to a node of the AC grid and a second grid terminal 902 connectable to another node of the AC grid.

The current sinking arrangement 900 has a first node between the first grid terminal 101a and the second grid terminal 902 shown in FIG. 9 as N901. The current sinking arrangement 900 has a current diversion branch 930 having a first end 931 connected to the first node N901 and a second end 932 connected to ground.

The current diversion branch 930 has a first impedance 933 connected in series between the first end 931 and the second end 932, and a first switch 934 connected in series between the first end 931 and the second end 932. The first switch 934 is non-conducting (open) in a first state and conducting (closed) in a second state.

The current diversion branch 930 has a bypass arrangement 970 of the type described in relation to FIG. 7. Hence, the bypass arrangement 970 comprises a bypass impedance 971 connected in series between the first end 931 and the second end 932, and a bypass branch 972 connected in parallel with the bypass impedance 971.

Additionally, the current sinking arrangement 900 comprises an arc detector 990.

The general operation of the ninth embodiment is the same as for the seventh embodiment. In other words, in normal conditions, current flows between the grid terminals 901 and 902, and current does not flow in the current diversion branch 930.

On reception of a signal indicating the second state, which in this embodiment is based on data from the arc detector 990, the switching arrangement 940 is arranged to close the first switch 934, diverting current away from the AC grid to ground.

On reception of the signal indicating the second state, the switching mechanism 940 is also arranged to selectively make the second switch 973 conducting or non-conducting so as to vary an amount of current diverted away from the AC grid in the second state.

Hence, in this embodiment, the arc detector 990 forms part of the control mechanism for the switching arrangement 940. In particular, on detection of an arc, the control mechanism is arranged to send a signal to the switching arrangement 940 indicating an arc fault condition.

Figure 10:
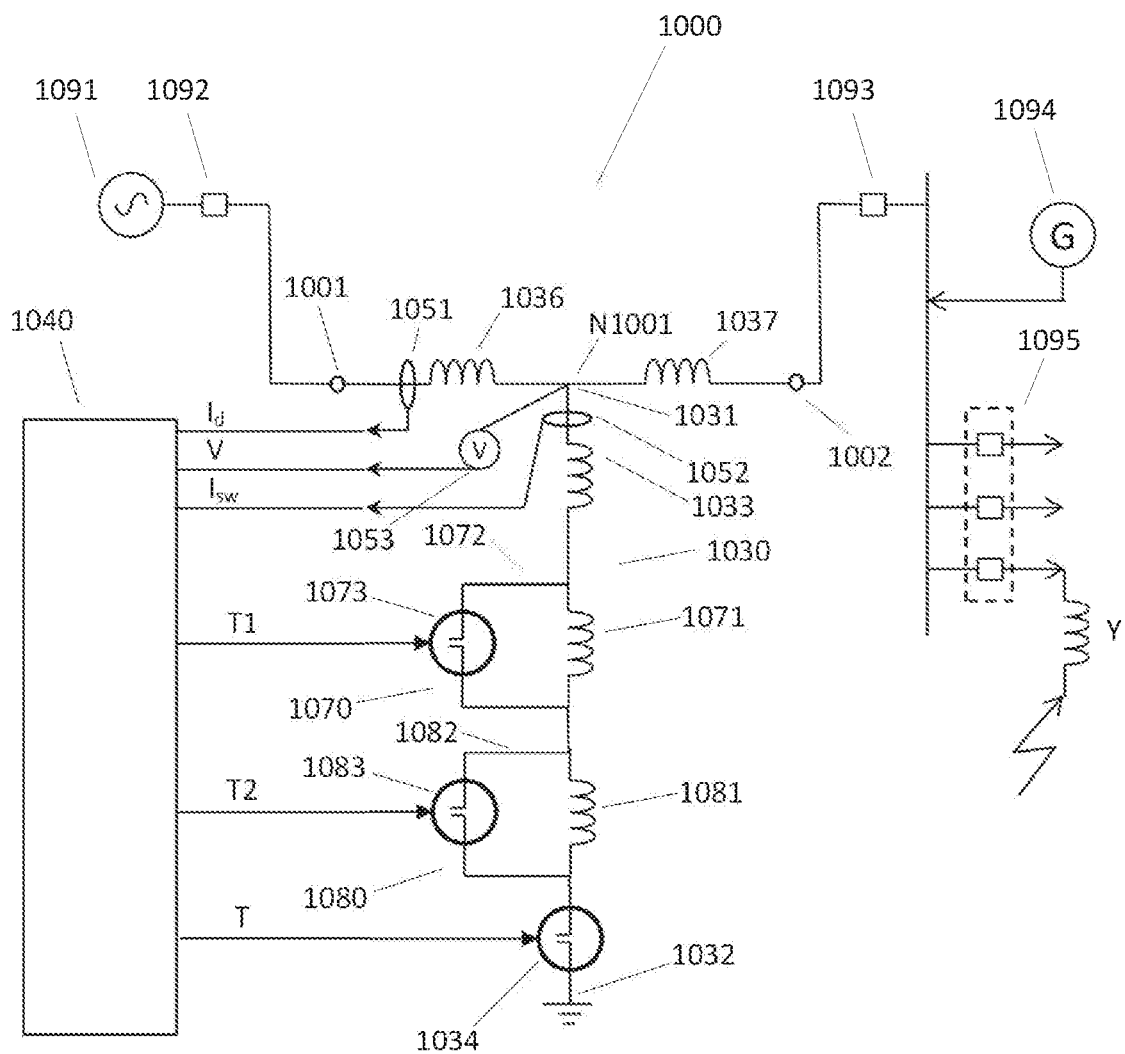
FIG. 10 shows a schematic illustration of a current sinking arrangement according to a tenth embodiment of the invention.

FIG. 10 shows a schematic illustration of a current sinking arrangement woo according to a tenth embodiment of the invention. The current sinking arrangement 1000 is arranged for connection to a single phase of an AC grid. In FIG. 10, the current sinking arrangement moo is shown connected to the grid. The same arrangement can be used for connection into a 3-phase AC grid. In that case FIG. 10 depicts one phase out of the 3 phases of the arrangement. The discussion below focuses on a 3-phase system, where three such arrangements would be provided.

The current sinking arrangement 1000 has a first grid terminal 1001 and a second grid terminal 1002, with a first node N1001 there between. The current sinking arrangement 1000 has a current diversion branch 1030 having a first end 1031 connected to the first node N1001 and a second end 1032 connected to ground.

Additionally, the current sinking arrangement woo comprises a second impedance 1036 connected in series between the first grid terminal 1001 and the first node N1001, and a third impedance 1037 connected in series between the first node N1001 and the second grid terminal 1002.

The current sinking arrangement 100 also comprises a first current sensor 1051 between the second impedance 1036 and the first grid terminal low, and second current sensor 1052 between the first node N1001 and the first impedance 1033. A voltage sensor 1053 is also provided to detect the voltage of the first node N1001.

The current diversion branch 1030 has a first impedance 1033 connected in series between the first end 1031 and the second end 1032, and a first switch 1034 connected in series between the first end 1031 and the second end 1032.

The current diversion branch 1030 has a first bypass arrangement 1070 that comprises a bypass impedance 1071 connected in series between the first end 1031 and the second end 1032, and a bypass branch 1072 connected in parallel with the bypass impedance 1071. The bypass branch 1071 also comprises a second switch 1073.

The current diversion branch 1030 has a second bypass arrangement 1080 that comprises a bypass impedance 1081 connected in series between the first end 1031 and the second end 1032, and a bypass branch 1082 connected in parallel with the bypass impedance 1081. The bypass branch 1081 also comprises a second switch 1083.

The switches 1034, 1071 and 1081 are controlled by the switching arrangement 1040 using trigger signals T, T1 and T2 (as shown in FIG. 10) based on data from the first current sensor 1051, second current sensor 1052, and the first voltage sensor 1053.

The AC grid comprises in this example a main power source 1091 operating at 22 kV and with rated power of 75 MVA. It is followed by a circuit breaker 1092, and is aimed to drive current into a distribution grid represented by circuit breakers 1095.

Additional generators are connected to the grid, represented here as one generator 1094 for clarity. These generators operate at 22 kV with combined power rating of 35 MVA.

In this example, the fault current contribution of the main power source 1091 is 11.5 kA, and the fault current contribution of generators 1094 is 6.35 kA. The circuit breakers in the distribution grid 1095 have a short circuit current interruption capability of 12 kA RMS. It is clear that without means for fault current reduction, the combined fault current contribution from both sources (17.85 kA) exceeds the distribution grid's capabilities.

A current sinking arrangement woo is therefore introduced into the network. A first terminal 1001 is connected to circuit breaker 1092, and a second terminal 1002 is connected to circuit breaker 1093. The current sinking arrangement moo is arranged to conduct current from grid terminals 1001 to 1002 and vice versa in a first state (normal conditions) and to divert a portion of the current into the current diversion path 1030 in a second state (short circuit current conditions).

The conduction of current in the current diversion branch 1030 is achieved by the first switch 1034 that is not conducting in the first state and is conducting in the second state. Currents sensors 1051 and 1052 are arranged to measure the currents of the main path (terminal 1001 to terminal 1002) and of the diversion path (N1001 to the second end 1032) respectively. A voltage sensor 1053 is also arranged to measure the voltage of the main circuit (e.g. from node N1001 to ground or to the common conductor as the case may be). It is clear that the current through terminal 1002 is readily available from the currents through current sensors 1051 and 1052.

The current diversion branch 1030 comprises at least one impedance 1033, and at least one bypass impedance 1071 or 1081. Bypass switches 1073 and/or 1083 are connected in parallel with the bypass impedances 1071 and/or 1081 respectively.

The switches 1034, 1083, 1073 are fast electronic switches as described in previous embodiments and are controlled by trigger signals T, T2, T1 respectively that are generated by the switching mechanism 1040. The switching mechanism 1040 generates the control signals based on measurements of one or more currents, voltages and/or current rate of change measured by the sensors.

The second and third impedances 1036, 1037 and the impedances in the current diversion branch 1030 are chosen to achieve a desired current division ratio between the distribution network and the diversion path, and/or between the main power source equipment and the diversion path depending on the fault location.

The inclusion of the bypass impedances mechanisms 1070 and/or 1080 in the current diversion branch, enables adjusting the current division ratio between the distribution grid and the diversion path. The switching mechanism 1040 may determine which if any bypass impedances should be activated, depending on the estimated short circuit current that is measured by the control mechanism.

The switching mechanism 1040 provides control signals to the electronic switches in order to keep them in conducting state until fault clearing by the distribution grid's protection means e.g. circuit breakers 1095. The time in which the switches may be in conducting state can be tens to hundreds of milliseconds. The switching mechanism 1040 may also send control signals to circuit breakers and receive control signals from arc protection relays, or from the system operator's management system (e.g. SCADA—not shown).

In the example shown in FIG. 10, the impedances are air-core coils and are selected as follows: second impedance 1036 is 0.04Ω, third impedance 1037 is 0.022Ω, first impedance 1033 is 0.022Ω, bypass impedance 1071 is 0.078Ω and bypass impedance 1081 is 0.3Ω. The coils in the current diversion branch 1030 can be designed with low quality-factor since they rarely conduct current.

Quantitative example for working of this arrangement in different fault conditions is shown below in Table 1 (before activation of the current diversion branch 1030) and Table 2 (after activation of the current diversion branch 1030) with numbering example accordingly with FIG. 10. The fault impedance is denoted by Y.

TABLE 1

| Case # | Short circuit reactance in fault location (Y) Ω | Detection current $I_d$ measured by sensor 1051 kA | Prospective Fault current through Y ($I_{sc}$) kA |
|---|---|---|---|
| 1 | 0 | 10.93 | 17.28 |
| 2 | 0.01 | 10.78 | 17.05 |
| 3 | 0.02 | 10.64 | 16.82 |
| 4 | 0.03 | 10.5 | 16.6 |
| 5 | 0.03 | 10.5 | 16.6 |
| 6 | 0.04 | 10.36 | 16.39 |
| 7 | 0.05 | 10.23 | 16.18 |
| 8 | 0.07 | 9.98 | 15.78 |
| 9 | 0.1 | 9.62 | 15.21 |
| 10 | 0.17 | 8.88 | 14 |
| 11 | 0.17 | 8.88 | 14 |
| 12 | 0.2 | 8.59 | 13.58 |
| 13 | 0.25 | 8.15 | 12.89 |
| 14 | 0.3 | 7.76 | 12.27 |
| 15 | 0.34 | 7.47 | 11.81 |

TABLE 2

| Case # | Current $I_{sw}$ through diversion branch 1030 measured by 1052 kA | Current $I_d$ measured by sensor 1051 kA | Fault current into Y from terminal 1002 kA | Limited fault current ($I_{sc}$) through Y kA | Activated Switches (conducting) | Impedance of diversion branch 1030 Ω |
|---|---|---|---|---|---|---|
| 1 | 5.52 | 11.03 | 5.52 | 11.87 | T/T1/T2 | 0.022 |
| 2 | 7.68 | 10.99 | 3.31 | 9.61 | T/T1/T2 | 0.022 |
| 3 | 9.15 | 10.96 | 1.81 | 8.08 | T/T1/T2 | 0.022 |
| 4 | 10.22 | 10.94 | 0.72 | 6.97 | T/T1/T2 | 0.022 |
| 5 | 4.88 | 10.71 | 5.83 | 12 | T/T1 | 0.1 |
| 6 | 5.59 | 10.65 | 5.06 | 11.19 | T/T1 | 0.1 |
| 7 | 6.2 | 10.6 | 4.39 | 10.48 | T/T1 | 0.1 |
| 8 | 7.23 | 10.5 | 3.27 | 9.3 | T/T1 | 0.1 |
| 9 | 8.4 | 10.4 | 2 | 7.96 | T/T1 | 0.1 |
| 10 | 10.14 | 10.25 | 0.11 | 5.95 | T/T1 | 0.1 |
| 11 | 4.65 | 9.5 | 4.85 | 10.32 | T | 0.4 |
| 12 | 5.07 | 9.36 | 4.29 | 9.67 | T | 0.4 |
| 13 | 5.66 | 9.15 | 3.49 | 8.75 | T | 0.4 |
| 14 | 6.15 | 8.98 | 2.83 | 7.99 | T | 0.4 |
| 15 | 6.48 | 8.87 | 2.39 | 7.47 | T | 0.4 |

In this embodiment, there are two fault current thresholds that will determine how much impedance the diversion branch should include. The measure for this decision is the current from terminal 1002 into the faulted location. If this current is lower than 1 kA—an additional impedance will be added to the current diversion branch 1030 (either bypass impedance 1071 or 1081) will be added by switching off switches 1073 or 1083 or both. This is done in order to allow sufficient current flow into the faulted location—to enable grid protection to operate properly with full selectivity.

In this embodiment, it is possible to sequence the operation of the switches as follows:

Upon fault detection, all of the switches are turned on. Then, after e.g. 20 msec the switching mechanism can determine the strength of the fault (i.e. estimate impedance Y) and decide to stop individual conduction of switches 1073, 1083 or both in order to increase the diversion branch impedance. This will allow driving sufficient fault current into Y.

Case 1 represents the worst case fault with zero impedance. This requires the maximum amount of current diversion and as a result—only impedance 1033 is active in the diversion branch, and enables limiting the fault current at Y to just slightly below 12 kA.

Cases 2-4 represent increasingly higher fault impedances that still require the maximum amount of fault current diversion.

Cases 5-10 represent fault scenarios that require less diversion of fault current, resulting in engaging impedance 1081 in series with 1033, allowing for more fault current flow from 1002 into the fault location.

Finally, cases 11-15 represent the weakest faults (highest fault impedances, and lowest prospective fault currents). In these cases, both impedances 1071 and 1081 are engaged on top of 1033, resulting in the least amount of fault current diversion, and allowing more current to flow from 1002 into the faulted location.

When the current through terminal 1002 is determined to flow from the grid side into the diversion branch, the control mechanism will send commands to turn off switches 1073, 1082, 1034. For example, this can be determined by current measurement from the two current sensors, and the voltage sensor—to determine the direction of power flow. This is just a typical example demonstrating how the sinking arrangement can resume normal conduction and return to the first state.

As seen in Tables 1 and 2, the variable impedance in the diversion branch enables different current limiting levels of short circuit currents into the distribution grid. This arrangement enables keeping the main power source 1091 uninterrupted throughout the short circuit event's entire duration, and prevents complete loss of power to the loads connected to 1095. This variable limiting mechanism enables the distribution grid protection system to operate with selectivity, and clear only the faulted location in the grid by opening the relevant circuit breaker that feeds the faulted location.

It would be appreciated that this arrangement serves as an example, the principles of which are applicable to many of the discussions of the previous embodiments.

Figure 11:
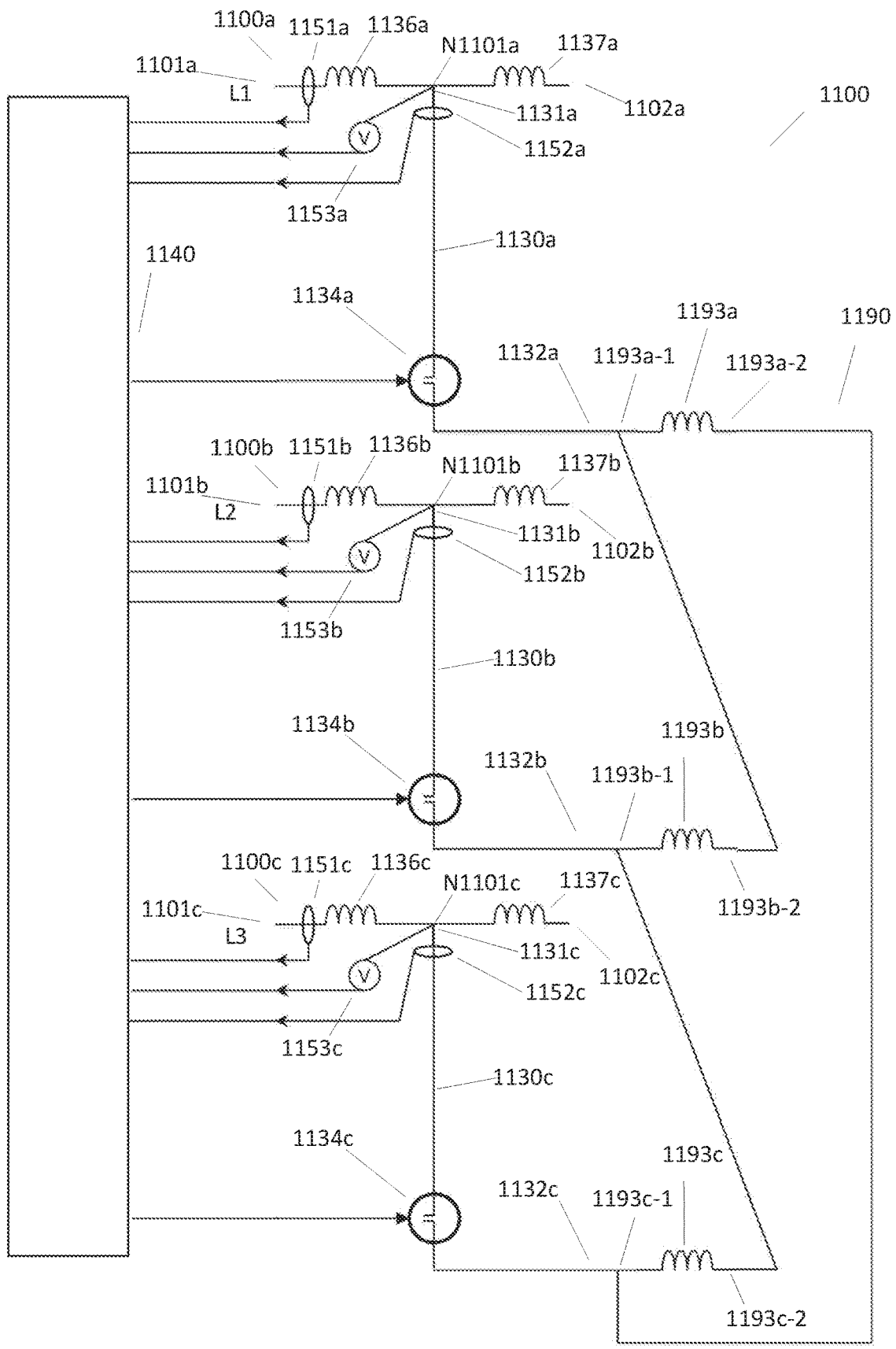
FIG. 11 shows a schematic illustration of a current sinking arrangement according to an eleventh embodiment of the invention.

FIG. 11 shows a schematic illustration of a current sinking arrangement 1100 according to an eleventh embodiment of the invention. The current sinking arrangement 1100 is arranged for connection to three phases L1, L2 and L3 of an AC grid.

As for the, for example, the first embodiment, the current sinking arrangement 1100 comprises first, second and third phase arrangements 1100a, 1100b, 1100c. The first phase arrangement 1100a includes a first grid terminal 1101a connectable to a node of a first phase L1 of the three phase AC grid and a second grid terminal 1102a connectable to another node of the first phase L1 of the three phase AC grid.

The first phase arrangement 1100a has a first node between the first grid terminal 1101a and the second grid terminal 1102a shown in FIG. 11 as N1101a.

The first phase arrangement 1100a has a current diversion branch 1130a having a first end 1131a connected to the first node N1101a and a second end 1132a connected to a three phase delta-connected floating impedance arrangement 1190. The current diversion branch 1130a of the first phase arrangement 1100a has a first switch 1134a connected in series between the first end 1131a and the second end 1132a. The first switch 1134a is not conducting (open or OFF) in a first state and conducting (closed or ON) in a second state.

The first switch 1134a is implemented as a set of thyristors, for example, as a set of thyristors is shown in FIG. 1c. However, other embodiments could implement the first switch 1134a using different components, for example any of those discussed in relation to the first embodiment.

Additionally, the first phase arrangement 1100a comprises a second impedance 1136a connected in series between the first grid terminal 1101a and the first node N1101a, and a third impedance 1137a connected in series between the first node N1101a and the second grid terminal 1102a.

The second and third impedances 1136a, 1137a in this embodiment are provided as current limiting reactors. However, the second and third impedances 1136a, 1137a could be implemented using different components, and could be any of the types of impedances mentioned in relation to the first embodiment. For example, the second and third impedances 1136a, 1137a may include just the parasitic impedances of interconnections of the current sinking arrangement 1100, or they may represent the inherent impedances of the grid itself, or combinations of parasitic impedances and grid impedances.

The first phase arrangement 1100a also comprises a first current sensor 1151a between the second impedance 1136a and the first grid terminal nom, and a second current sensor 112a between the first node N1101a and the second end.

The first current sensor 1151a is provided to detect the current at the first grid terminal 1101a. Hence, in the first state, the first current sensor 1151a detects the current between the first grid terminal nom and the second grid terminal 1102a. In other embodiments, the first current sensor 1151a may be provided at any location in the current sinking device 1100 so as to detect the current between the first grid terminal 1101a and the second grid terminal nota. In other words, the first current sensor 1151a need not be located exactly in the position as shown in FIG. 11.

The first current sensor 1151a may be any suitable current sensor. For example, the first current sensor 1151a may be a current transformer, a Hall effect sensor, a shunt, or a Rogowski coil.

The second current sensor 1152a is provided to detect the current on the current diversion branch 1130a. In other embodiments, the second current sensor 1151a may be provided any location in the current sinking device 1100 so as to detect the current on current diversion branch 1130a, and need not be located exactly in the position as shown in FIG. 11. In some embodiments, the second current sensor may be omitted.

The second current sensor 1152a may be any suitable current sensor. For example, the second current sensor 1152a may be a current transformer, a Hall effect sensor, a shunt, or a Rogowski coil, or any suitable sensor.

A voltage sensor 1153a is also provided to detect the voltage at the first node N1101a. In other embodiments, the voltage sensor may be provided in any location between terminals 1101a and 1102a.

The voltage sensor 1153a may be any suitable voltage sensor. For example, the voltage sensor 1153a may be a voltage transformer, a resistive divider, a capacitive divider etc. In some embodiments, the voltage sensor may be omitted.

The first current sensor 1151a, second current sensor 1152a and voltage sensor 1153a are connected to a switching arrangement 1140. In this embodiment, the switching arrangement 1140 controls first switch 1134a based on current and voltage data provided by the first current sensor 1151a, second current sensor 1152a, and voltage sensor 1153a, as discussed in more detail below.

The second and third phase arrangements 1100b and 1100c of this embodiment have equivalent structures to the first phase arrangement 1100a, and are shown in FIG. 11 with corresponding reference numerals.

In other words, the second and third phase arrangements 1100b, 1100c each have a current diversion branch 1101b, 1101c with a first end 1131b, 1131c connected to the first node N1101b, N201c and a second end 1132b, 1132c connected to the three phase delta-connected floating impedance arrangement 1190, with the current diversion branch N1101b, N1101c comprising the first switch 1134b, 1134c (e.g. a set of thyristors).

The second and third phase arrangements 1100b, 1100c also each have a second impedance 1136b, 1136c (e.g. a current limiting reactor) connected in series between the first grid terminal 1101b, now and the first node N1101b, N1101c; and a third impedance 1137b, 1137c (e.g. a current limiting reactor) connected in series between the first node N1101b, N1101c and the second grid terminal 1102b, 1102C.

The second and third phase arrangements 1100b, 1100c also each comprise a first current sensor 1151b, 1151c between the second impedance 1136b, 1136c and the first grid terminal 1101b, 1101c; and a second current sensor 1152b, 1152c between the first node N1101b, N1101c and the second end. A voltage sensor 1153b, 1153c is also provided to detect the voltage at the first node N1101b, N1101c.

Based on the data from the first and second current sensors and the voltage sensor in the first, second and third phase arrangements 1100a, 1100b, 1100c, the switching arrangement 1140 controls first switches 1134a, 1134b, 1134c. In other words, any combination of the first and second current sensors and the voltage sensor in the first, second and third phase arrangements 1100a, 1100b, 1100c acts as a control mechanism for the current sinking arrangement 1100. In some embodiments the switching arrangement 1140 may send a command signal to switches 1134a, 1134b, and 1134c simultaneously to move from the first state (not conducting) to the second state (conducting) based on current and/or voltage sensors of just one of the phases.

In some embodiments, the switching arrangement 1140 may send a command signal to switches 1134a, 1134b, and 1134c simultaneously to move from the second state (conducting) to the first state (not conducting) based on current and/or voltage sensors of just one of the phases, or based on a reading from the sensors of all 3 phases.

Hence, when the first switches 1134a, 1134b, 1134c are in the second state (i.e. closed or conducting), the current diversion branches 1100a, 1100b, 1100c are arranged to divert current away from the AC grid to the three phase delta-connected floating impedance arrangement 1190.

The three phase delta-connected floating impedance arrangement 1190 comprises first, second and third impedances 1193a, 1193b and 1193c.

The first, second and third impedances 1193a, 1193b and 1193c may be implemented by current limiting impedances with any conventional form. For example, the impedances could be an air-core reactor, iron-core reactor, resistor, or combinations of these elements, etc.

The second end 1132a of the first current diversion branch 1130a is connected to the first terminal 1193a-1 of the first impedance 1193a. The first terminal 1193a-1 of the first impedance 1193a is also connected to the second terminal 1193b-2 of the second impedance 1193b. The second terminal 1193a-2 of the first impedance 1193a is connected to the first terminal 1193c-1 of the third impedance 1193c.

The second end 1132b of the second current diversion branch mob is connected to the first terminal 1193b-1 of the second impedance 1193b. The first terminal 1193b-1 of the second impedance 1193b is connected to the second terminal 1193c-2 of the third impedance 1193c. The second terminal 1193b-2 of the second impedance 1193b is connected to the first terminal 1193a-1 of the first impedance 1193a.

The second end 1132c of the third current diversion branch 1130c is connected to the first terminal 1193c-1 of the third impedance 1193c. The first terminal 1193c-1 of the third impedance 1193c is connected to the second terminal 1193a-2 of the first impedance 1193a. The second terminal 1193c-2 of the third impedance 1193c is connected to the first terminal 1193b-1 of the second impedance 1193b.

The use of a three phase delta-connected floating impedance arrangement (compared to connecting to ground) avoids injection of large diverted current during fault current limiting operation from the grid into ground. Such injection can cause raising of ground potential and should be avoided. The use of a three phase delta-connected floating impedance arrangement is therefore associated with a number of the advantages associated with FIG. 1 such as avoiding full exposure to transient over-voltages such as lightning impulses and switching impulses, lower voltage exposure during a single phase to earth fault etc. This leads to a reduced component count, lower cost, and higher reliability.

In variants of the eleventh embodiment, one or both of the second and third impedances 1136a, 1137a could be omitted, as could the current and voltage sensors. Furthermore, one or more bypass arrangements (e.g. as described in FIG. 4) could be provided. In addition, in other variants of the eleventh embodiment, one or more impedances could be provided in the current diversion branches. Furthermore, one or more fuses as described above could be added. Generally, it will be appreciated that many of the features are variants discussed in relation to FIGS. 1 to 10 could be used with this embodiment.

Figure 12:
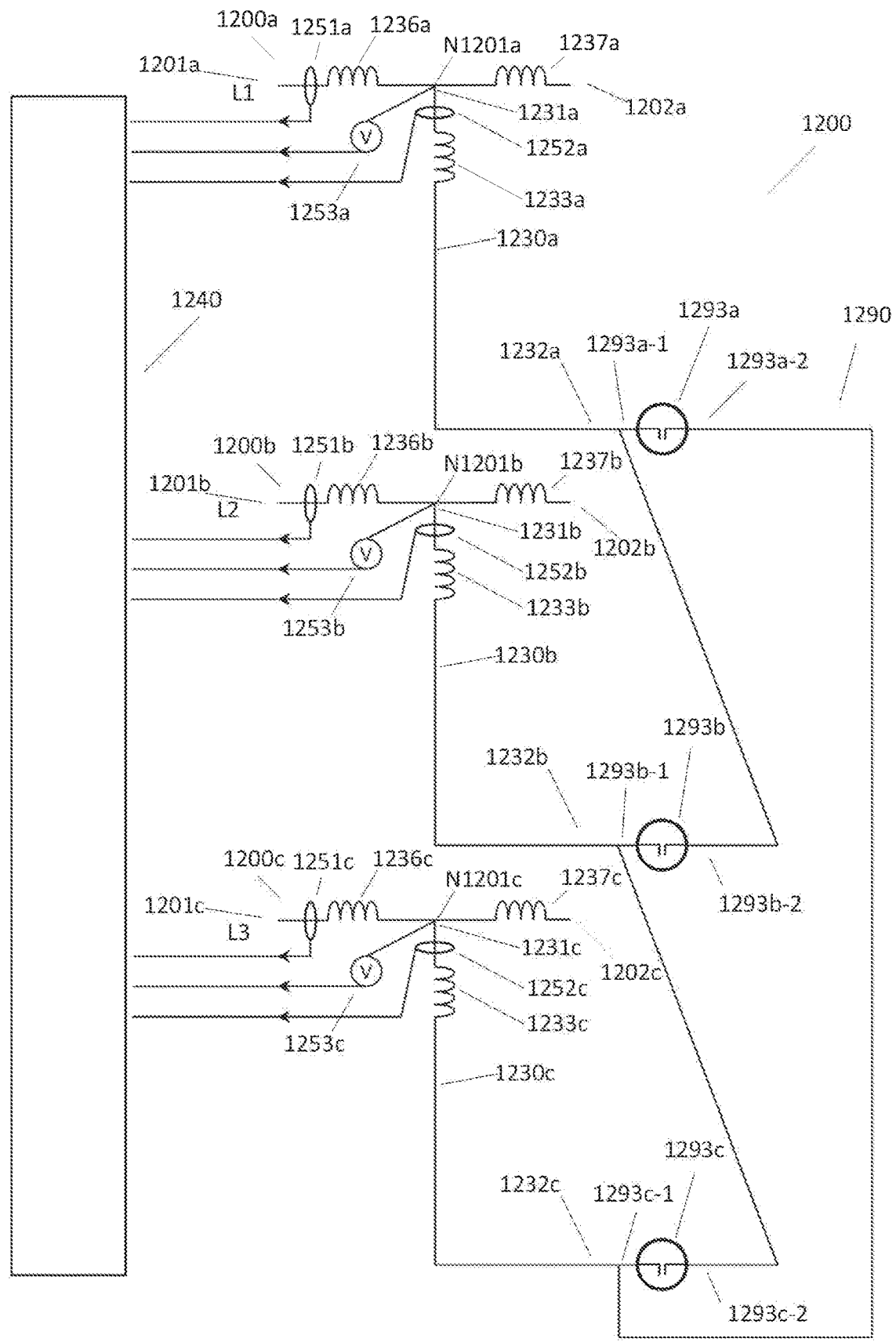
FIG. 12 shows a schematic illustration of a current sinking arrangement according to a twelfth embodiment of the invention.

FIG. 12 shows a schematic illustration of a current sinking arrangement 1200 according to a twelfth embodiment of the invention. The current sinking arrangement 1200 is arranged for connection to three phases L1, L2 and L3 of an AC grid.

As for the, for example, the first embodiment, the current sinking arrangement 1200 comprises first, second and third phase arrangements 1200a, 1200b, 1200c. The first phase arrangement 1200a includes a first grid terminal 1201a connectable to a node of a first phase L1 of the three phase AC grid and a second grid terminal 1202a connectable to another node of the first phase L1 of the three phase AC grid.

The first phase arrangement 1200a has a first node between the first grid terminal 1201a and the second grid terminal 1202a shown in FIG. 12 as N2101a.

The first phase arrangement 1200a has a current diversion branch 1230a having a first end 1231a connected to the first node N1101a and a second end 1232a connected to a three phase delta-connected set of switches 1290. The current diversion branch 1230a of the first phase arrangement 1200a has a first impedance 1233a connected in series between the first end 1231a and the second end 1232a.

As discussed in more detail below, the three phase delta-connected set of switches is configured to be in non-conducting state in a first state and conducting state in a second state.

The first impedance 1233a in this embodiment is provided as a current limiting reactor. However, other embodiments could implement the first impedance 1233a using different components, for example any of those discussed in relation to the first embodiment.

Additionally, the first phase arrangement 1200a comprises a second impedance 1236a connected in series between the first grid terminal 1201a and the first node N1201a, and a third impedance 1237a connected in series between the first node N1201a and the second grid terminal 1202a.

The second and third impedances 1236a, 1237a in this embodiment are provided as current limiting reactors. However, as for the first impedance 1233a, they could be implemented using different components, and could be any of the types of impedances mentioned in relation to the first embodiment. For example, as for the first impedance 1233a, second and third impedances 1236a, 1237a may include just the parasitic impedances of interconnections of the current sinking arrangement 1200, or they may represent the inherent impedances of the grid itself, or combinations of parasitic impedances and grid impedances.

The first phase arrangement 1200a also comprises a first current sensor 1251a between the second impedance 1236a and the first grid terminal 1201a, and a second current sensor 112a between the first node N1101a and the first impedance 1233a.

The first current sensor 1251a is provided to detect the current at the first grid terminal 1101a. Hence, the first current sensor 1251a detects the current between the first grid terminal 1201a and the second grid terminal 1202a. In other embodiments, the first current sensor 1251a may be provided at any location in the current sinking device 1200 so as to detect the current between the first grid terminal 1201a and the second grid terminal 1202a. In other words, the first current sensor 1251a need not be located exactly in the position as shown in FIG. 12.

The first current sensor 1251a may be any suitable current sensor. For example, the first current sensor 1251a may be a current transformer, a Hall effect sensor, a shunt, or a Rogowski coil.

The second current sensor 1252a is provided to detect the current on the current diversion branch 1230a. In other embodiments, the second current sensor 1251a may be provided any location in the current sinking device 1200 so as to detect the current on current diversion branch 1230a, and need not be located exactly in the position as shown in FIG. 12. In some embodiments the second current sensor may be omitted.

The second current sensor 1252a may be any suitable current sensor. For example, the second current sensor 1252a may be a current transformer, a Hall effect sensor, a shunt, or a Rogowski coil, or any suitable sensor.

A voltage sensor 1253a is also provided to detect the voltage at the first node N1201a. In other embodiments the voltage sensor may be provided in any location between terminals 1201a and 1202a.

The voltage sensor 1253a may be any suitable voltage sensor. For example, the voltage sensor 1253a may be a voltage transformer, a resistive divider, a capacitive divider etc. In some embodiments the voltage sensor may be omitted.

The first current sensor 1251a, second current sensor 1252a and voltage sensor 1253a are connected to a switching arrangement 1240. In this embodiment, the switching arrangement 1240 controls first switch 1234a based on current and voltage data provided by the first current sensor 1251a, second current sensor 1252a, and voltage sensor 1253a, as discussed in more detail below.

The second and third phase arrangements 1200b and 1200c of this embodiment have equivalent structures to the first phase arrangement 1200a, and are shown in FIG. 12 with corresponding reference numerals.

In other words, the second and third phase arrangements 1200b, 1200c each have a current diversion branch 1230b, 1230c with a first end 1231b, 1231c connected to the first node N1201b, N1201c and a second end 1232b, 1232c connected to the 3-phase delta-connected set of switches, with the current diversion branch 1230b, 1230c comprising the first impedance 1233b, 1233c (e.g. a current limiting reactor).

The second and third phase arrangements 1200b, 1200c also each have a second impedance 1236b, 1236c (e.g. a current limiting reactor) connected in series between the first grid terminal 1201b, 1201C and the first node N1201b, N1201c; and a third impedance 1237b, 1237c (e.g. a current limiting reactor) connected in series between the first node N1201b, N1201c and the second grid terminal 1202b, 1202C.

The second and third phase arrangements 1200b, 1200c also each comprise a first current sensor 1251b, 1251c between the second impedance 1236b, 1236c and the first grid terminal 1201b, 1201C; and a second current sensor 1252b, 1252c between the first node N1201b, N1201c and the first impedance 1233b, 1233c. A voltage sensor 1253b, 1253c is also provided to detect the voltage at the first node N1201b, N1201c.

The three phase delta-connected set of switches 1290 comprises first, second and third switches 1293a, 129313, and 1293c. The first, second and third switches 1293a, 129313, and 1293c of the phase delta-connected set of switches are configured to be in non-conducting state in the first state and conducting state in the second state, and are controlled by the switching mechanism 1240.

The second end 1232a of the first current diversion branch 1230a is connected to the first terminal 1293a-1 of the first switch 1293a. The first terminal 1293a-1 of the first switch 1293a is also connected to the second terminal 1293b-2 of the second switch 1293b. The second terminal 1293a-2 of the first switch 1293a is connected to the first terminal 1293c-1 of the third switch 1293c.

The second end 1232b of the second current diversion branch 1230b is connected to the first terminal 1293b-1 of the second switch 1293b. The first terminal 1293b-1 of the second switch 129313, is connected to the second terminal 1293c-2 of the third switch 1293c. The second terminal 1293b-2 of the second switch 129313, is connected to the first terminal 1293a-1 of the first switch 1293a.

The second end 1232c of the third current diversion branch 1230b is connected to the first terminal 1293c-1 of the third switch 1293c. The first terminal 1293c-1 of the third switch 1293c is connected to the second terminal 1193a-2 of the first switch 1293a. The second terminal 1193c-2 of the third switch 1293c is connected to the first terminal 1193b-1 of the second switch 1293b.

The first switch 1293a, second switch 1293b, and third switch 1293c in this embodiment are each provided a set of thyristors that are non-conducting (i.e. open) in the first state, i.e. in non-conducting state. In other embodiments, the first switch 1293a, second switch 1293b, and third switch 1293c could be formed by one or more fast acting switching elements, capable of switching from off state to on state within less than 1 milli-second. They may be implemented by multiple types of fast switching devices and particularly by semiconductor devices suitable for crow-bar applications, such as thyristors. Such semiconductor devices need to have the capability to conduct sufficiently large current in the second state and be capable of blocking sufficiently large voltage of the AC power system in normal and possible over voltage conditions when in the first state (not conducting). The first switch 1293a, second switch 1293b, and third switch 1293c may have the form shown in FIG. 1c. However, given the sequence of phase currents in a delta-connected structure, the switches may be implemented by just one column of thyristors instead of two, since current flow will always be in one direction. This may results in reduced component count, cost and improved reliability.

Based on the data from the first and second current sensors and the voltage sensor in the first, second and third phase arrangements 1200*a*, 1200*b*, 1200*c*, the switching arrangement 1240 controls the first switch 1293*a*, second switch 1293*b*, and third switch 1293*c*. In other words, any combination of the first and second current sensors and the voltage sensor in the first, second and third phase arrangements 1200*a*, 1200*b*, 1200*c* acts as a control mechanism for the current sinking arrangement 1200. In some embodiments the switching arrangement 1240 may send a command signal to the first switch 1293*a*, the second switch 1293*b*, and the third switch 1293*c* simultaneously to move from the first state (not conducting) to the second state (conducting) based on current and/or voltage sensors of just one of the phases.

In some embodiments, the switching arrangement 1240 may send a command signal to the first switch 1293*a*, the second switch 1293*b*, and the third switch 1293*c* simultaneously to move from the second state (conducting) to the first state (not conducting) based on current and/or voltage sensors of just one of the phases, or based on a reading from the sensors of all 3 phases.

Hence, when the first switch 1293*a*, second switch 1293*b*, and third switch 1293*c* are in the second state (i.e. closed or conducting), the current diversion branches 1200*a*, 1200*b*, 1200*c* are arranged to divert current away from the three phases of the AC grid.

The use of a three phase delta-connected floating set of switches 1290 avoids injection of large diverted current during fault current limiting operation from the grid into ground. Such injection can cause raising of ground potential and should be avoided. The use of a three phase delta-connected floating set of switches 1290 is therefore associated with a number of the advantages associated with FIG. 1, such as avoiding full exposure to transient over-voltages such as lightning impulses and switching impulses, etc. Furthermore, it benefits from the unidirectional current flow in the delta structure. This could in some cases lead to a reduced component count, lower cost, and higher reliability.

In variants of the twelfth embodiment, one or both of the second and third impedances 1236*a*, 1237*a* could be omitted, as could the current and voltage sensors. Furthermore, one or more bypass arrangements (e.g. as described in FIG. 4) could be provided.

Furthermore, one or more fuses as described above could be added. Generally, it will be appreciated that many of the features are variants discussed in relation to FIGS. 1 to 10 could be used with this embodiment.

As discussed, embodiments can provide a current sinking arrangement for connection to three phases of an AC grid, operable for reduction of short circuit currents in the AC grid, the current diverting arrangement comprising first, second and third phase arrangements, each including first and second grid terminals and a current diversion branch having a first impedance and a first switch and connected to a common floating conductor (or a three phase delta connected floating impedance arrangement, or a three phase delta-connected set of switches). On reception of a signal indicating a fault, which requires fault current reduction, a switching arrangement is arranged to make the first switches conducting so as to divert a portion of the fault current away from the AC grid fault location to the common floating conductor (or to the three phase delta connected floating impedance arrangement, or to the three phase delta-connected set of switches).

Embodiments can provide a current sinking arrangement for connection to three phases of an AC grid, the current diverting arrangement comprising: a first phase arrangement including: a first grid terminal connectable to a node of a first phase of the three phase AC grid and a second grid terminal connectable to another node of the first phase of the three phase AC grid, the first phase arrangement having a first node between the first grid terminal and the second grid terminal; a current diversion branch having a first end connected to the first node and a second end connected to a second node, the current diversion branch comprising a first impedance connected in series between the first end and the second end, and a first switch connected in series between the first end and the second end, and wherein the first switch is not conducting in a first state and is conducting in a second state; a second phase arrangement including: a first grid terminal connectable to a node of a second phase of the three phase AC grid and a second grid terminal connectable to another node of the second phase of the three phase AC grid, the second phase arrangement having a first node between the first grid terminal and the second grid terminal; a current diversion branch having a first end connected to the first node and a second end connected to a second node, the current diversion branch comprising a first impedance connected in series between the first end and the second end, and a first switch connected in series between the first end and the second end, and wherein the first switch is not conducting in the first state and conducting in the second state; a third phase arrangement including: a first grid terminal connectable to a node of a third phase of the three phase AC grid and a second grid terminal connectable to another node of the third phase of the three phase AC grid, the third phase arrangement having a first node between the first grid terminal and the second grid terminal; a current diversion branch having a first end connected to the first node and a second end connected to a second node, the current diversion branch comprising a first impedance connected in series between the first end and the second end, and a first switch connected in series between the first end and the second end, and wherein the first switch is not conducting in the first state and conducting in the second state; a switching arrangement arranged to control the first switch of the first phase arrangement, the first switch of the second phase arrangement, and the first switch of the third phase arrangement; wherein the second nodes of the first phase arrangement, the second phase arrangement, and the third phase arrangement are all connected to a common floating conductor; wherein the first state represents normal conditions on the AC grid and the second state represents a fault condition on the AC grid; wherein, on reception of a signal indicating the second state, the switching arrangement is arranged to make the first switch of the first phase arrangement, the first switch of the second phase arrangement, and the first switch of the third phase arrangement conducting; wherein, when the first switches are in the second state, the current diversion branches are arranged to divert a portion of the fault current away from the AC grid fault location to the common floating conductor.

The common floating conductor may be implemented as metallic busbar (e.g. made of copper or aluminium) that is isolated from ground. In other embodiments, the common floating conductor could be made from any suitable conductor, e.g. a set of connected conducting cables (e.g. made of copper or aluminium) that is isolated from ground.

Embodiments can provide a current sinking arrangement for connection to three phases of an AC grid, the current diverting arrangement comprising: a first phase arrangement including: a first grid terminal connectable to a node of a first phase of the three phase AC grid and a second grid terminal connectable to another node of the first phase of the three phase AC grid, the first phase arrangement having a first node between the first grid terminal and the second grid terminal; a current diversion branch having a first end connected to the first node and a second end, the current diversion branch comprising first switch connected in series between the first end and the second end, and wherein the first switch is not conducting in a first state and is conducting in a second state; a second phase arrangement including: a first grid terminal connectable to a node of a second phase of the three phase AC grid and a second grid terminal connectable to another node of the second phase of the three phase AC grid, the second phase arrangement having a first node between the first grid terminal and the second grid terminal; a current diversion branch having a first end connected to the first node and a second end, the current diversion branch comprising first switch connected in series between the first end and the second end, and wherein the first switch is not conducting in the first state and conducting in the second state; a third phase arrangement including: a first grid terminal connectable to a node of a third phase of the three phase AC grid and a second grid terminal connectable to another node of the third phase of the three phase AC grid, the third phase arrangement having a first node between the first grid terminal and the second grid terminal; a current diversion branch having a first end connected to the first node and a second end, the current diversion branch comprising a first switch connected in series between the first end and the second end, and wherein the first switch is not conducting in the first state and conducting in the second state; a switching arrangement arranged to control the first switch of the first phase arrangement, the first switch of the second phase arrangement, and the first switch of the third phase arrangement; wherein the second ends of the first phase arrangement, the second phase arrangement, and the third phase arrangement are all connected to a three phase delta connected floating impedance arrangement; wherein the first state represents normal conditions on the AC grid and the second state represents a fault condition on the AC grid; wherein, on reception of a signal indicating the second state, the switching arrangement is arranged to make the first switch of the first phase arrangement, the first switch of the second phase arrangement, and the first switch of the third phase arrangement conducting; wherein, when the first switches are in the second state, the current diversion branches are arranged to divert a portion of the fault current away from the AC grid fault location to the three phase delta connected floating impedance arrangement.

The three phase delta connected floating impedance arrangement may comprise: a first impedance, having a first terminal connected to the second end of the current division branch of the first phase arrangement, and a second terminal; a second impedance, having a first terminal connected to the second end of the current division branch of the second phase arrangement, and a second terminal; a third impedance, having a first terminal connected to the second end of the current division branch of the third phase arrangement, and a second terminal; wherein first terminal of the first impedance is connected to the second terminal of the second impedance, and the second terminal of the first impedance is connected to the first terminal of the third impedance; wherein first terminal of the second impedance is connected to the second terminal of the third impedance, and the second terminal of the third impedance is connected to the first terminal of the second impedance.

Embodiments can also provide a current sinking arrangement for connection to three phases of an AC grid, the current diverting arrangement comprising: a first phase arrangement including: a first grid terminal connectable to a node of a first phase of the three phase AC grid and a second grid terminal connectable to another node of the first phase of the three phase AC grid, the first phase arrangement having a first node between the first grid terminal and the second grid terminal; a current diversion branch having a first end connected to the first node and a second end connected to a second node, the current diversion branch comprising a first impedance connected in series between the first end and the second end; a second phase arrangement including: a first grid terminal connectable to a node of a second phase of the three phase AC grid and a second grid terminal connectable to another node of the second phase of the three phase AC grid, the second phase arrangement having a first node between the first grid terminal and the second grid terminal; a current diversion branch having a first end connected to the first node and a second end connected to a second node, the current diversion branch comprising a first impedance connected in series between the first end and the second end; a third phase arrangement including: a first grid terminal connectable to a node of a third phase of the three phase AC grid and a second grid terminal connectable to another node of the third phase of the three phase AC grid, the third phase arrangement having a first node between the first grid terminal and the second grid terminal; a current diversion branch having a first end connected to the first node and a second end connected to a second node, the current diversion branch comprising a first impedance connected in series between the first end and the second end; wherein the second nodes of the first phase arrangement, the second phase arrangement, and the third phase arrangement are all connected to a three phase delta-connected set of switches, configured to be non-conducting in a first state and conducting in a second state; a switching arrangement arranged to control the three phase delta-connected set of switches; wherein the first state represents normal conditions on the AC grid and the second state represents a fault condition on the AC grid; wherein, on reception of a signal indicating the second state, the switching arrangement is arranged to make the 3-phase delta-connected set of switches conducting; wherein, when the three phase delta-connected set of switches is conducting, the current diversion branches are arranged to divert a portion of the fault current away from the AC grid fault location to the three phase delta-connected set of switches.

The three phase delta-connected set of switches may comprise: a first switch, having a first terminal connected to the second end of the current division branch of the first phase arrangement, and a second terminal, wherein the first switch is not conducting in the first state and conducting in the second state; a second switch, having a first terminal connected to the second end of the current division branch of the second phase arrangement, and a second terminal, wherein the first switch is not conducting in the first state and conducting in the second state; a third switch, having a first terminal connected to the second end of the current division branch of the third phase arrangement, and a second terminal, wherein the first switch is not conducting in the first state and conducting in the second state; wherein first terminal of the first switch is connected to the second terminal of the second switch, and the second terminal of the first switch is connected to the first terminal of the third switch; wherein first terminal of the second switch is connected to the second terminal of the third switch, and the second terminal of the third switch is connected to the first terminal of the second switch; wherein, on reception of the signal indicating the second state, the switching arrangement is arranged to make the first switch, the second switch and the third switch conducting.

The above described current sinking arrangements for connection to three phases may be provided with various other features in some embodiments. For example, an impedance may be provided between one or both of the grid terminals for each phase arrangement. Likewise, the current division branches may be provided with one or more additional impendences. In addition, bypass impedances may be provided to provide a variable current divider as discussed above. Furthermore, various current and voltage sensors may be provided as required. Furthermore, one or more fuses could be provided in the current division branches.

Generally, the phase arrangements (e.g. the first phase arrangement, the second phase arrangement, and the third phase arrangement) of the above described current sinking arrangements may have the same set of features (i.e. be essentially the same arrangements). However, embodiments are not limited to this, and ma provide phase arrangements (e.g. the first phase arrangement, the second phase arrangement, and the third phase arrangement) with different features or combinations of features.

As discussed, embodiments can provide a single phase current sinking arrangement comprising: a grid terminal connectable to a node of a single phase of an AC grid and a second grid terminal connectable to another node of the single phase of the AC grid, a current diversion branch having a first end connected to a first node between the first grid terminal and the second grid terminal, and a second end connected to ground, the current diversion branch comprising: a first impedance connected in series between the first end and the second end, a first switch connected in series between the first end and the second end, and wherein the first switch is open in a first state and closed in a second state; a bypass arrangement connected in series between the first end and the second end, the bypass arrangement comprising a bypass impedance connected in series between the first end and the second end, and a bypass branch connected in parallel with the bypass impedance, the bypass branch comprising a second switch, wherein when the second switch is closed the bypass impedance is electrically bypassed; a switching arrangement arranged to control the first switch and the second switch; wherein the first state represents normal conditions on the AC grid and the second state represents a fault condition on the AC grid; wherein, on reception of a signal indicating the second state, the switching arrangement is arranged to make the first switch conducting, wherein, when the first switch is in the second state, the current diversion branch is arranged to divert current away from the AC grid to ground; wherein, on reception of the signal indicating the second state, the switching mechanism is further arranged to selectively make the second switch conducting or non-conducting so as to vary an amount of current diverted away from the AC grid in the second state.

Embodiments can also provide a three phase current sinking arrangement for connection to three phases of the AC grid, the current sinking arrangement comprising: a first single phase current sinking arrangement according to any discussed embodiment for a first phase of the AC grid; a second single phase current sinking arrangement according to any discussed embodiment for a second phase of the AC grid; and a third single phase current sinking arrangement according to any to any discussed embodiment for a third phase of the AC grid.

Many further variations and modifications will suggest themselves to those versed in the art upon making reference to the foregoing illustrative embodiments, which are given by way of example only, and which are not intended to limit the scope of the invention, that being determined by the appended claims

The invention claimed is:

1. A current sinking arrangement for connection to three phases of an AC grid, operable for reduction of short circuit currents in the AC grid, the current diverting arrangement comprising:
   a first phase arrangement including:
      a first grid terminal connectable to a node of a first phase of the three phase AC grid and a second grid terminal connectable to another node of the first phase of the three phase AC grid, the first phase arrangement having a first node between the first grid terminal and the second grid terminal;
      a current diversion branch having a first end connected to the first node and a second end connected to a second node, the current diversion branch comprising a first impedance connected in series between the first end and the second end, and a first switch connected in series between the first end and the second end, and wherein the first switch is not conducting in a first state and is conducting in a second state;
   a second phase arrangement including:
      a first grid terminal connectable to a node of a second phase of the three phase AC grid and a second grid terminal connectable to another node of the second phase of the three phase AC grid, the second phase arrangement having a first node between the first grid terminal and the second grid terminal;
      a current diversion branch having a first end connected to the first node and a second end connected to a second node, the current diversion branch comprising a first impedance connected in series between the first end and the second end, and a first switch connected in series between the first end and the second end, and wherein the first switch is not conducting in the first state and conducting in the second state;
   a third phase arrangement including:
      a first grid terminal connectable to a node of a third phase of the three phase AC grid and a second grid terminal connectable to another node of the third phase of the three phase AC grid, the third phase arrangement having a first node between the first grid terminal and the second grid terminal;
      a current diversion branch having a first end connected to the first node and a second end connected to a second node, the current diversion branch comprising a first impedance connected in series between the first end and the second end, and a first switch connected in series between the first end and the second end, and wherein the first switch is not conducting in the first state and conducting in the second state;
   a switching arrangement arranged to control the first switch of the first phase arrangement, the first switch of the second phase arrangement, and the first switch of the third phase arrangement;

wherein the second nodes of the first phase arrangement, the second phase arrangement, and the third phase arrangement are all connected to a common floating conductor;

wherein the first state represents normal conditions on the AC grid and the second state represents a fault condition on the AC grid;

wherein, on reception of a signal indicating the second state, the switching arrangement is arranged to make the first switch of the first phase arrangement, the first switch of the second phase arrangement, and the first switch of the third phase arrangement conducting;

wherein, when the first switches are in the second state, the current diversion branches are arranged to divert a portion of the fault current away from the AC grid fault location to the common floating conductor.

2. A current sinking arrangement according to claim 1, wherein one or more of the first phase arrangement, the second phase arrangement and the third phase arrangements includes a second impedance connected in series between the first grid terminal and the second grid terminal, the second impedance having a first terminal connected to the first grid terminal and a second terminal connected to the first node;

wherein at least the combination of the first impedance and the second impedance acts as a current divider when the first switches are in the second state, so as to determine a portion of the current that is diverted away from the AC grid to the common floating conductor.

3. A current sinking arrangement according to claim 1, wherein one or more of the first phase arrangement, the second phase arrangement and the third phase arrangements includes a third impedance connected in series between the first grid terminal and the second grid terminal, the third impedance having a first terminal connected to the first node and a second terminal connected to the second grid terminal;

wherein at least the combination of the first impedance and the third impedance acts as a current divider when the first switches are in the second state, so as to determine a portion of the current that is diverted away from the AC grid to the common floating conductor.

4. A current sinking arrangement according to claim 1, wherein one or more of the first phase arrangement, the second phase arrangement and the third phase arrangements includes:

at least one bypass arrangement connected in series between the first end and the second end, the at least one bypass arrangement comprising a bypass impedance connected in series between the first end and the second end, and a bypass branch connected in parallel with the bypass impedance, the bypass branch comprising a second switch, wherein when the second switch is closed the bypass impedance is electrically bypassed;

wherein, on reception of the signal indicating the second state, the switching mechanism is further arranged to independently selectively make the second switches of the at least one bypass arrangement conducting or non-conducting so as to vary an amount of current diverted away from the AC grid to the common floating conductor.

5. A current sinking arrangement according to claim 1, wherein one or more of the first phase arrangement, the second phase arrangement and the third phase arrangements includes:

a fuse connected in series between the first end and the second end of the current diversion branch.

6. A current sinking arrangement according to claim 1 wherein the first switch of one or more of the first phase arrangement, the second phase arrangement and the third phase arrangements includes one or more semiconductor devices.

7. A current sinking arrangement according to claim 1, further comprising:

a control mechanism arranged to detect the fault condition on the AC grid; wherein on detection of the fault condition, the control mechanism is arranged to send a signal indicating a fault condition to the switching arrangement;

wherein the control mechanism comprises a current sensor arranged to detect a change in grid current which represents a transition between normal and fault conditions; or wherein the control mechanism comprises a voltage sensor arranged to detect a change in grid voltage which represents a transition between normal and fault conditions; or wherein the control mechanism is arranged to detect the fault condition on the basis of a received signal from an external device.

8. A current sinking arrangement according to claim 7, wherein the control mechanism comprises an arc detector, and wherein on detection of an arc, the control mechanism is arranged to send a signal indicating an arc fault condition to the switching arrangement indicating it to transition to the second state.

9. A single phase current sinking arrangement comprising:
a grid terminal connectable to a node of a single phase of an AC grid and a second grid terminal connectable to another node of the single phase of the AC grid,
a current diversion branch having a first end connected to a first node between the first grid terminal and the second grid terminal, and a second end connected to ground, the current diversion branch comprising:
a first impedance connected in series between the first end and the second end,
a first switch connected in series between the first end and the second end, and wherein the first switch is open in a first state and closed in a second state;
a bypass arrangement connected in series between the first end and the second end, the bypass arrangement comprising a bypass impedance connected in series between the first end and the second end, and a bypass branch connected in parallel with the bypass impedance, the bypass branch comprising a second switch, wherein when the second switch is closed the bypass impedance is electrically bypassed;
a switching arrangement arranged to control the first switch and the second switch;
wherein the first state represents normal conditions on the AC grid and the second state represents a fault condition on the AC grid;
wherein, on reception of a signal indicating the second state, the switching arrangement is arranged to make the first switch conducting, wherein, when the first switch is in the second state, the current diversion branch is arranged to divert current away from the AC grid to ground;
wherein, on reception of the signal indicating the second state, the switching mechanism is further arranged to selectively make the second switch conducting or non-conducting so as to vary an amount of current diverted away from the AC grid in the second state.

10. A single phase current sinking arrangement according to claim 9, further comprising a second impedance connected in series between the first grid terminal and the second grid terminal, the second impedance having a first terminal connected to the first grid terminal and a second terminal connected to the first node;
  wherein at least the combination of the first impedance and the second impedance acts as a current divider when the first switch is in the second state, so as to determine a portion of the current that is diverted away from the AC grid to ground.

11. A single phase current sinking arrangement according to claim 9, further comprising a third impedance connected in series between the first grid terminal and the second grid terminal, the third impedance having a first terminal connected to the first node and a second terminal connected to the second grid terminal;
  wherein at least the combination of the first impedance and the third impedance acts as a current divider when the first switch is in the second state, so as to determine a portion of the current that is diverted away from the AC grid to ground.

12. A single phase current sinking arrangement according to claim 9, further comprising at least one additional bypass arrangement, wherein, on reception of the signal indicating the second state, the switching mechanism is further arranged to independently selectively make the second switches of the respective bypass arrangements conducting or non-conducting so as to vary an amount of current diverted away from the AC grid in the second state.

13. A single current sinking arrangement according to claim 9, wherein the first switch includes one or more semiconductor devices.

14. A single phase current sinking arrangement according to claim 9, further comprising:
  a control mechanism arranged to detect the fault condition on the AC grid;
wherein on detection of the fault condition, the control mechanism is arranged to send a signal indicating a fault condition to the switching arrangement; and wherein based on the signal indicating a fault condition, the switching arrangement is arranged to selectively make the second switch conducting or non-conducting so as to vary an amount of current diverted away from the AC grid;
wherein the control mechanism comprises a current sensor arranged to detect a change in grid current which represents a fault condition; or
wherein the control mechanism comprises a voltage sensor arranged to detect a change in grid voltage which represents a fault condition; or
wherein the control mechanism is arranged to detect the fault condition on the basis of a received signal from an external device.

15. A single phase current sinking arrangement according to claim 14, wherein the control mechanism comprises an arc detector, and wherein on detection of an arc, the control mechanism is arranged to send a signal indicating an arc fault condition to the switching arrangement.

16. A three phase current sinking arrangement for connection to three phases of the AC grid, the current sinking arrangement comprising:
  a first single phase current sinking arrangement according to claim 9 for a first phase of the AC grid;
  a second single phase current sinking arrangement according to claim 9 for a second phase of the AC grid; and
  a third single phase current sinking arrangement according to claim 9 for a third phase of the AC grid.

17. A current sinking arrangement for connection to three phases of an AC grid, operable for reduction of short circuit currents in the AC grid, the current diverting arrangement comprising:
  a first phase arrangement including:
    a first grid terminal connectable to a node of a first phase of the three phase AC grid and a second grid terminal connectable to another node of the first phase of the three phase AC grid, the first phase arrangement having a first node between the first grid terminal and the second grid terminal;
    a current diversion branch having a first end connected to the first node and a second end, the current diversion branch comprising first switch connected in series between the first end and the second end, and wherein the first switch is not conducting in a first state and is conducting in a second state;
  a second phase arrangement including:
    a first grid terminal connectable to a node of a second phase of the three phase AC grid and a second grid terminal connectable to another node of the second phase of the three phase AC grid, the second phase arrangement having a first node between the first grid terminal and the second grid terminal;
    a current diversion branch having a first end connected to the first node and a second end, the current diversion branch comprising first switch connected in series between the first end and the second end, and wherein the first switch is not conducting in the first state and conducting in the second state;
  a third phase arrangement including:
    a first grid terminal connectable to a node of a third phase of the three phase AC grid and a second grid terminal connectable to another node of the third phase of the three phase AC grid, the third phase arrangement having a first node between the first grid terminal and the second grid terminal;
    a current diversion branch having a first end connected to the first node and a second end, the current diversion branch comprising a first switch connected in series between the first end and the second end, and wherein the first switch is not conducting in the first state and conducting in the second state;
  a switching arrangement arranged to control the first switch of the first phase arrangement, the first switch of the second phase arrangement, and the first switch of the third phase arrangement;
  wherein the second ends of the first phase arrangement, the second phase arrangement, and the third phase arrangement are all connected to a three phase delta connected floating impedance arrangement;
  wherein the first state represents normal conditions on the AC grid and the second state represents a fault condition on the AC grid;
  wherein, on reception of a signal indicating the second state, the switching arrangement is arranged to make the first switch of the first phase arrangement, the first switch of the second phase arrangement, and the first switch of the third phase arrangement conducting;
  wherein, when the first switches are in the second state, the current diversion branches are arranged to divert a portion of the fault current away from the AC grid fault location to the three phase delta connected floating impedance arrangement.

18. A current sinking arrangement according to claim 17, wherein the three phase delta connected floating impedance arrangement comprises:

a first impedance, having a first terminal connected to the second end of the current division branch of the first phase arrangement, and a second terminal;

a second impedance, having a first terminal connected to the second end of the current division branch of the second phase arrangement, and a second terminal;

a third impedance, having a first terminal connected to the second end of the current division branch of the third phase arrangement, and a second terminal;

wherein first terminal of the first impedance is connected to the second terminal of the second impedance, and the second terminal of the first impedance is connected to the first terminal of the third impedance;

wherein first terminal of the second impedance is connected to the second terminal of the third impedance, and the second terminal of the third impedance is connected to the first terminal of the second impedance.

19. A current sinking arrangement for connection to three phases of an AC grid, operable for reduction of short circuit currents in the AC grid, the current diverting arrangement comprising:

a first phase arrangement including:
 a first grid terminal connectable to a node of a first phase of the three phase AC grid and a second grid terminal connectable to another node of the first phase of the three phase AC grid, the first phase arrangement having a first node between the first grid terminal and the second grid terminal;
 a current diversion branch having a first end connected to the first node and a second end connected to a second node, the current diversion branch comprising a first impedance connected in series between the first end and the second end;

a second phase arrangement including:
 a first grid terminal connectable to a node of a second phase of the three phase AC grid and a second grid terminal connectable to another node of the second phase of the three phase AC grid, the second phase arrangement having a first node between the first grid terminal and the second grid terminal;
 a current diversion branch having a first end connected to the first node and a second end connected to a second node, the current diversion branch comprising a first impedance connected in series between the first end and the second end;

a third phase arrangement including:
 a first grid terminal connectable to a node of a third phase of the three phase AC grid and a second grid terminal connectable to another node of the third phase of the three phase AC grid, the third phase arrangement having a first node between the first grid terminal and the second grid terminal;
 a current diversion branch having a first end connected to the first node and a second end connected to a second node, the current diversion branch comprising a first impedance connected in series between the first end and the second end;

wherein the second nodes of the first phase arrangement, the second phase arrangement, and the third phase arrangement are all connected to a three phase delta-connected set of switches, configured to be non-conducting in a first state and conducting in a second state;

a switching arrangement arranged to control the three phase delta-connected set of switches;

wherein the first state represents normal conditions on the AC grid and the second state represents a fault condition on the AC grid;

wherein, on reception of a signal indicating the second state, the switching arrangement is arranged to make the 3-phase delta-connected set of switches conducting;

wherein, when the three phase delta-connected set of switches is conducting, the current diversion branches are arranged to divert a portion of the fault current away from the AC grid fault location to the three phase delta-connected set of switches.

20. A current sinking arrangement according to claim 19, wherein the three phase delta-connected set of switches comprises:

a first switch, having a first terminal connected to the second end of the current division branch of the first phase arrangement, and a second terminal, wherein the first switch is not conducting in the first state and conducting in the second state;

a second switch, having a first terminal connected to the second end of the current division branch of the second phase arrangement, and a second terminal, wherein the first switch is not conducting in the first state and conducting in the second state;

a third switch, having a first terminal connected to the second end of the current division branch of the third phase arrangement, and a second terminal, wherein the first switch is not conducting in the first state and conducting in the second state;

wherein first terminal of the first switch is connected to the second terminal of the second switch, and the second terminal of the first switch is connected to the first terminal of the third switch;

wherein first terminal of the second switch is connected to the second terminal of the third switch, and the second terminal of the third switch is connected to the first terminal of the second switch;

wherein, on reception of the signal indicating the second state, the switching arrangement is arranged to make the first switch, the second switch and the third switch conducting.

* * * * *